US011948314B2

(12) United States Patent
Liao et al.

(10) Patent No.: US 11,948,314 B2
(45) Date of Patent: Apr. 2, 2024

(54) SYSTEMS AND METHODS FOR IMAGE PROCESSING

(71) Applicant: SHANGHAI UNITED IMAGING INTELLIGENCE CO., LTD., Shanghai (CN)

(72) Inventors: Shu Liao, Shanghai (CN); Yunhao Ge, Cambridge, MA (US); Dongming Wei, Shanghai (CN)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 0 days.

(21) Appl. No.: 17/651,806

(22) Filed: Feb. 20, 2022

(65) Prior Publication Data

US 2022/0172382 A1 Jun. 2, 2022

Related U.S. Application Data

(63) Continuation of application No. 16/729,303, filed on Dec. 28, 2019, now Pat. No. 11,270,446.

(30) Foreign Application Priority Data

Dec. 28, 2018 (CN) ........................ 201811622772.3

(51) Int. Cl.
*G06T 7/30* (2017.01)
*G06T 7/55* (2017.01)

(52) U.S. Cl.
CPC ................. *G06T 7/30* (2017.01); *G06T 7/55* (2017.01); *G06T 2207/10081* (2013.01); *G06T 2207/10088* (2013.01); *G06T 2207/10104* (2013.01); *G06T 2207/10116* (2013.01); *G06T 2207/10132* (2013.01); *G06T 2207/20021* (2013.01); *G06T 2207/20081* (2013.01)

(58) Field of Classification Search
None
See application file for complete search history.

(56) References Cited

U.S. PATENT DOCUMENTS 5,305,204 A 4/1994 Ohhashi
10,176,405 B1 * 1/2019 Zhou ...................... G06T 7/246
(Continued)

FOREIGN PATENT DOCUMENTS

CN 102013020 A 4/2011
CN 105957013 A 9/2016
(Continued)

OTHER PUBLICATIONS

Y. Wang et al., "3D Auto-Context-Based Locality Adaptive Multi-Modality GANs for PET Synthesis," in IEEE Transactions on Medical Imaging, vol. 38, No. 6, pp. 1328-1339, Jun. 2019, doi: 10.1109/TMI.2018.2884053.*
(Continued)

*Primary Examiner* — Jiangeng Sun
(74) *Attorney, Agent, or Firm* — METIS IP LLC

(57) ABSTRACT

The present disclosure is related to systems and methods for image processing. The method includes obtaining a first image of a first modality. The method includes generating a second image of a second modality by processing, based on a trained machine learning model, the first image. The second modality may be different from the first modality.

20 Claims, 14 Drawing Sheets

(56) References Cited

U.S. PATENT DOCUMENTS

| | | | | |
|---|---|---|---|---|
| 10,504,268 | B1 * | 12/2019 | Huang | G06V 10/772 |
| 2017/0270653 | A1 | 9/2017 | Garnavi et al. | |
| 2017/0351935 | A1 * | 12/2017 | Liu | G06V 10/454 |
| 2017/0372155 | A1 | 12/2017 | Odry et al. | |
| 2017/0372193 | A1 | 12/2017 | Mailhe et al. | |
| 2018/0260957 | A1 * | 9/2018 | Yang | G06T 7/143 |
| 2018/0271430 | A1 * | 9/2018 | Ramella-Roman | A61B 5/435 |
| 2018/0330511 | A1 * | 11/2018 | Ha | G06F 30/00 |
| 2018/0357514 | A1 * | 12/2018 | Zisimopoulos | G06V 10/764 |
| 2019/0021677 | A1 * | 1/2019 | Grbic | G06T 7/11 |
| 2019/0051056 | A1 * | 2/2019 | Chiu | G06F 16/903 |
| 2019/0066281 | A1 * | 2/2019 | Zheng | G06T 7/174 |
| 2019/0228579 | A1 * | 7/2019 | Kaifosh | G06T 19/00 |
| 2019/0259153 | A1 * | 8/2019 | Zhang | G06N 3/047 |
| 2019/0318474 | A1 * | 10/2019 | Han | A61N 5/103 |
| 2019/0333199 | A1 * | 10/2019 | Ozcan | G06T 3/4046 |
| 2019/0333623 | A1 * | 10/2019 | Hibbard | A61N 5/1039 |
| 2020/0184660 | A1 * | 6/2020 | Shi | G06T 7/30 |
| 2020/0211209 | A1 | 7/2020 | Liao et al. | |
| 2020/0357153 | A1 | 11/2020 | Zhao et al. | |

FOREIGN PATENT DOCUMENTS

| | | |
|---|---|---|
| CN | 106373109 A | 2/2017 |
| CN | 107945204 A | 4/2018 |
| CN | 108133201 A | 6/2018 |

OTHER PUBLICATIONS

International Search Report in PCT/CN2019/129582 dated Mar. 27, 2020, 5 pages.

Written Opinion in PCT/CN2019/129582 dated Mar. 27, 2020, 5 pages.

First Office Action in Chinese Application No. 201811622772.3 dated May 13, 2020, 24 pages.

Xiang, Lei et al., Deep Embedding Convolutional Neural Network for Synthesizing CT Image from T1-Weighted MR Image, Med. Image Anal., 2018, 25 pages.

Yuta Hiasa et al., Cross-Modality Image Synthesis from Unpaired Data using CycleGAN: Effects of Gradient Consistency Loss and Training Data Size, International Workshop on Simulation and Synthesis in Medical Imaging, 2018, 10 pages.

Nie, Dong et al., Medical Image Synthesis with Deep Convolutional Adversarial Networks, IEEE Transactions on Biomedical Engineering, 65(12):2720-2730, 2018.

Cao, Xiaohuan et al., Region-Adaptive Deformable Registration of CT/MRI Pelvic Images via Learning-Based Image Synthesis, IEEE Transactions on Image Processing, 27(7): 3500-3512, 2018.

Phillip Isola et al., Image-to-Image Translation with Conditional Adversarial Networks, 2017 IEEE Conference on Computer Vision and Pattern Recognition, 5967-5976, 2017.

Zhu, Junyan et al., Unpaired Image-to-Image Translation using Cycle-Consistent Adversarial Networks, IEEE International Conference on Computer Vision (ICCV), 2018, 18 pages.

Jelmer M. Wolterink et al., Deep MR to CT Synthesis using Unpaired Data, International Workshop on Simulation and Synthesis in Medical Imaging, 2017, 10 pages.

Olaf Ronneberger et al., U-Net: Convolutional Networks for Biomedical Image Segmentation, Medical Image Computing and Computer-Assisted Intervention-MICCAI, 2015, 8 pages.

He, Kaiming et al., Deep Residual Learning for Image Recognition, 2016 IEEE Conference on Computer Vision and Pattern Recognition (CVPR), 770-778, 2016.

Brian B. Avants et al., A Reproducible Evaluation of ANTs Similarity Metric Performance in Brain Image Registration, Neuroimage, 54(3): 2033-2044, 2011.

* cited by examiner

Figure 9:
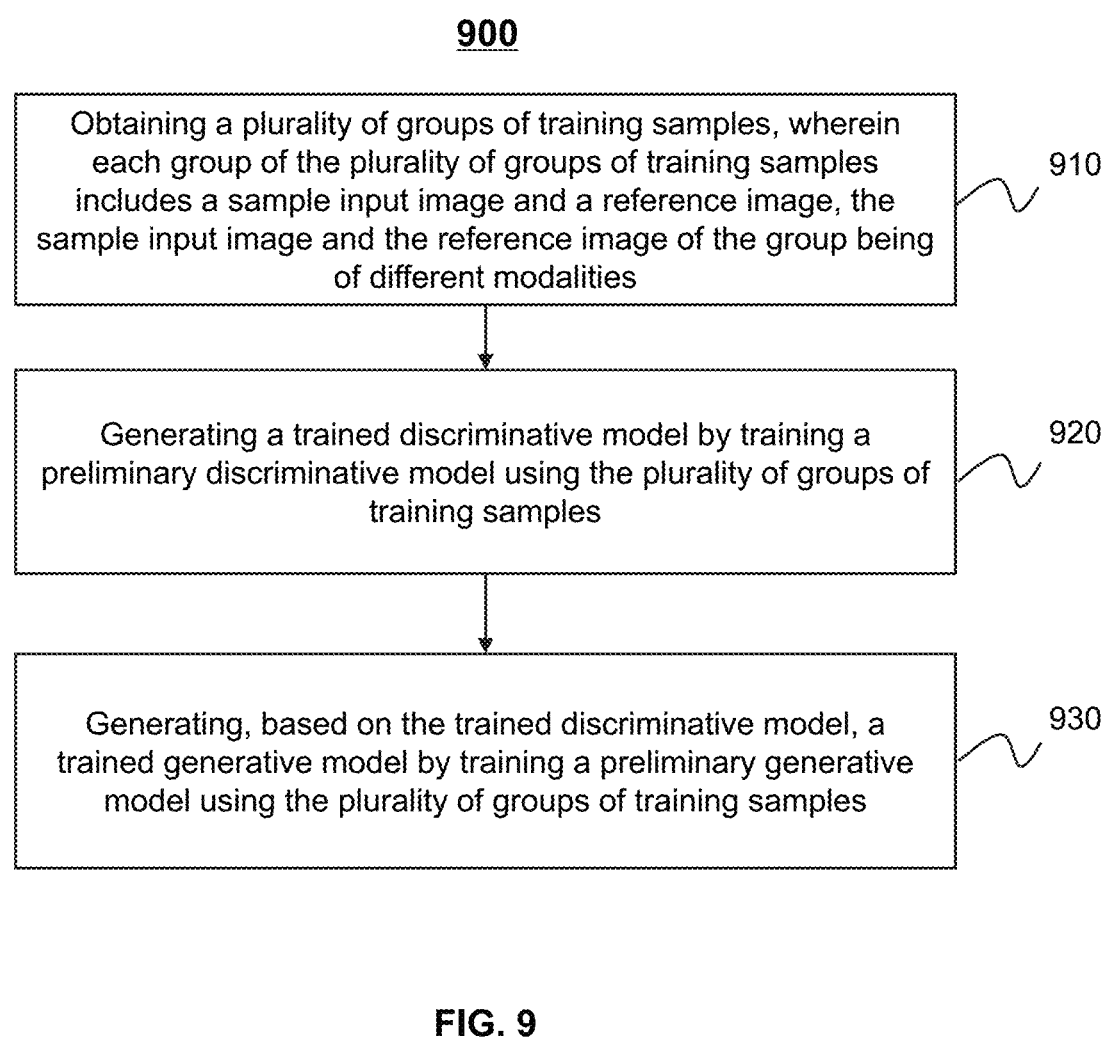

900

Obtaining a plurality of groups of training samples, wherein each group of the plurality of groups of training samples includes a sample input image and a reference image, the sample input image and the reference image of the group being of different modalities

910

Generating a trained discriminative model by training a preliminary discriminative model using the plurality of groups of training samples

920

Generating, based on the trained discriminative model, a trained generative model by training a preliminary generative model using the plurality of groups of training samples

Figure 12:
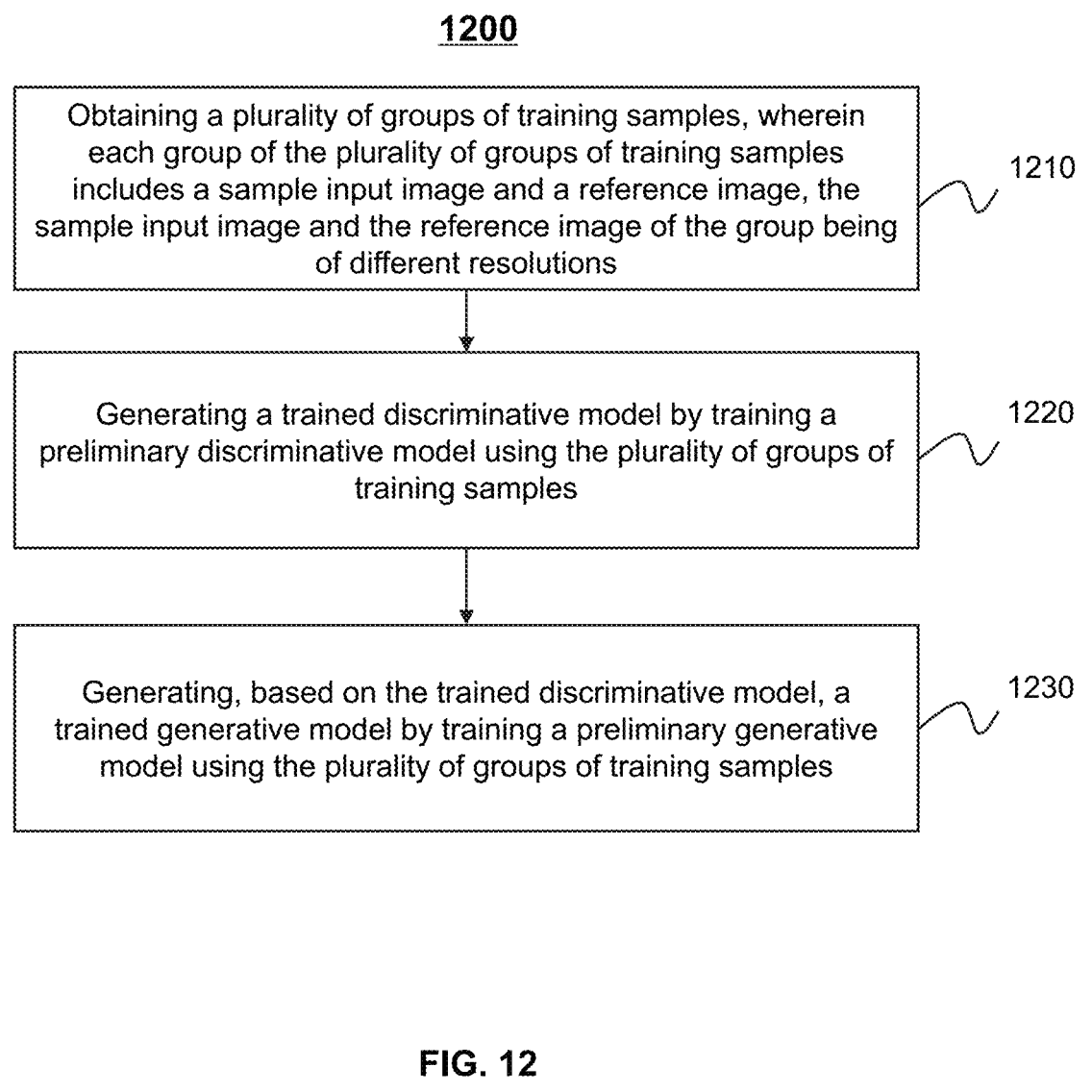

Obtaining a plurality of groups of training samples, wherein each group of the plurality of groups of training samples includes a sample input image and a reference image, the sample input image and the reference image of the group being of different resolutions

1210

Generating a trained discriminative model by training a preliminary discriminative model using the plurality of groups of training samples

1220

Generating, based on the trained discriminative model, a trained generative model by training a preliminary generative model using the plurality of groups of training samples

SYSTEMS AND METHODS FOR IMAGE PROCESSING

CROSS-REFERENCE TO RELATED APPLICATIONS

This application is a Continuation of U.S. application Ser. No. 16/729,303, filed on Dec. 28, 2019, which claims priority of Chinese Patent Application No. 201811622772.3, filed on Dec. 28, 2018, the contents of each of which are hereby incorporated by reference.

TECHNICAL FIELD

This disclosure generally relates to a system and method for image processing, and more particularly, relates to systems and methods for medical image synthesis across modalities.

BACKGROUND

Acquiring images of a same anatomy with multiple different contrasts may increase the diversity of diagnostic information. For example, a radiotherapy treatment planning may use a magnetic resonance (MR) image for segmentation of a tumor volume and an organ at risk (OAR), as well as a corresponding computed tomography (CT) image for dose planning. Separate acquisition of these images is time-consuming, costly and burdensome to a subject (e.g., a patient). For example, CT exposes radiation during acquisition, which may cause side effects to the subject. Therefore, to circumvent separate CT acquisition, a range of techniques have been proposed for MR-only radiotherapy treatment planning in which a substitute or synthetic CT image is derived from an MR image. A traditional cross-modality synthesis technique is registration-based. Specifically, a plurality of pairs of MR images and CT images may be registered to generate a plurality of pairs of registered MR images and CT images. An MR image in each of the plurality of registered pairs may be registered with a test MR image. A plurality of CT images in the plurality of registered pairs may be registered with each other based on a registration relationship between the MR image and the test MR image. A target CT image corresponding to the test MR image may be generated based on a registration relationship between the plurality of CT images. However, the performance of the registration-based technique depends highly on the registration accuracy, and the image registration process may be complex and take a long processing time. Therefore, it is desirable to provide systems and methods for cross-modality image synthesis without image registration.

SUMMARY

According to an aspect of the present disclosure, a system for image processing may include at least one storage device storing a set of instructions, and at least one processor in communication with the at least one storage device. When executing the stored set of instructions, the at least one processor may cause the system to perform a method. The method may include obtaining a first image of a first modality. The method may include generating a second image of a second modality by processing, based on a trained machine learning model, the first image. The second modality may be different from the first modality.

In some embodiments, the method may include dividing the first image into a plurality of first sub-images. The method may include generating a plurality of second sub-images by processing, based on the trained machine learning model, the plurality of first sub-images. The method may include generating, based on the plurality of second sub-images, the second image.

In some embodiments, the trained machine learning model may be obtained according to a training process. The training process may include obtaining a plurality of groups of training samples. The training process may include generating the trained machine learning model by training a preliminary machine learning model using the plurality of groups of training samples. Each group of the plurality of groups of training samples may include a sample input image and a reference image. The sample input image and the reference image of the group may be of different modalities.

In some embodiments, the training process may include performing a rigid registration operation on the sample input image and the reference image in each group of the plurality of groups of training samples.

In some embodiments, the trained machine learning model may be constructed based on a generative adversarial network (GAN).

In some embodiments, the trained machine learning model may include a trained generative model and a trained discriminative model. The training process may include generating the trained discriminative model by training a preliminary discriminative model using the plurality of groups of training samples. The training process may include generating, based on the trained discriminative model, the trained generative model by training a preliminary generative model using the plurality of groups of training samples.

In some embodiments, the training process may include initializing parameter values of the preliminary generative model. The training process may include training, based on the trained discriminative model, the preliminary generative model by iteratively updating, based on the plurality of groups of training samples, the parameter values of the preliminary generative model.

In some embodiments, the iteratively updating, based on the plurality of groups of training samples, the parameter values of the preliminary generative model may include performing an iterative process. For each iteration of the iterative process, the training process may include retrieving a group of training samples from the plurality of groups of training samples. The training process may include generating a sample intermediate image by inputting a sample input image of the group of training samples into the preliminary generative model or an intermediate generative model generated in a prior iteration. The training process may include determining a value of a cost function based on the trained discriminative model, the group of training samples, and the sample intermediate image. The training process may include, in response to a determination that the value of the cost function does not satisfy a preset condition, updating the preliminary generative model or the intermediate generative model by updating at least some of the parameter values of the preliminary generative model or the intermediate generative model generated in a prior iteration.

In some embodiments, the trained discriminative model may include a first trained discriminative model and a second trained discriminative model. The training process may include determining, based on the sample intermediate image and the reference image, a first evaluation value relating to a difference between the sample intermediate image and the reference image using the first trained discriminative model. The training process may include determining, based on the sample input image and the sample intermediate image, a second evaluation value relating to a difference between the sample input image and the sample intermediate image using the second trained discriminative model. The training process may include determining, based on the first evaluation value and the second evaluation value, the value of the cost function.

In some embodiments, the training process may include extracting at least one first shape associated with the sample input image and at least one second shape associated with the sample intermediate image. The training process may include determining, based on a difference between the at least one first shape and the at least one second shape, the second evaluation value using the second trained discriminative model.

In some embodiments, the first image or the second image may include at least one of a computed tomography (CT) image, a magnetic resonance imaging (MRI) image, a positron emission tomography (PET) image, an ultrasound (US) image, or an X-ray image.

According to another aspect of the present disclosure, a non-transitory computer readable medium may include at least one set of instructions. When executed by at least one processor of a computing device, the at least one set of instructions may cause the at least one processor to effectuate a method. The method may include obtaining a first image of a first modality. The method may include generating a second image of a second modality by processing, based on a trained machine learning model, the first image. The second modality may be different from the first modality.

According to another aspect of the present disclosure, a system may include at least one storage device storing a set of instructions, and at least one processor in communication with the at least one storage device. When executing the stored set of instructions, the at least one processor may cause the system to perform a method. The method may include obtaining a first image of a first modality and a first resolution. The method may include generating a second image of a second modality and a second resolution by processing, based on a trained machine learning model, the first image. The second modality may be different from the first modality. The second resolution may be different from the first resolution.

In some embodiments, the method may include dividing the first image into a plurality of first sub-images. The method may include generating a plurality of second sub-images by processing, based on the trained machine learning model, the plurality of first sub-images. The method may include generating, based on the plurality of second sub-images, the second image.

In some embodiments, the trained machine learning model may be obtained according to a training process. The training process may include obtaining a plurality of groups of training samples. The training process may include generating the trained machine learning model by training a preliminary machine learning model using the plurality of groups of training samples. Each group of the plurality of groups of training samples may include a sample input image and a reference image. The sample input image and the reference image of the group may be of different modalities and different resolutions.

In some embodiments, the trained machine learning model may be constructed based on a generative adversarial network (GAN). In some embodiments, the trained machine learning model may include a trained generative model and a trained discriminative model. The training process may include generating the trained discriminative model by training a preliminary discriminative model using the plurality of groups of training samples. The training process may include generating, based on the trained discriminative model, the trained generative model by training a preliminary generative model using the plurality of groups of training samples.

In some embodiments, the training process may include initializing parameter values of the preliminary generative model. The training process may include training, based on the trained discriminative model, the preliminary generative model by iteratively updating, based on the plurality of groups of training samples, the parameter values of the preliminary generative model.

In some embodiments, the iteratively updating, based on the plurality of groups of training samples, the parameter values of the preliminary generative model may include performing an iterative process. For each iteration of the iterative process, the training process may include retrieving a group of training samples from the plurality of groups of training samples. The training process may include generating a sample intermediate image by inputting a sample input image of the group of training samples into the preliminary generative model or an intermediate generative model generated in a prior iteration. The training process may include determining a value of a cost function based on the trained discriminative model, the group of training samples, and the sample intermediate image. The training process may include, in response to a determination that the value of the cost function does not satisfy a preset condition, updating the preliminary generative model or the intermediate generative model by updating at least some of the parameter values of the preliminary generative model or the intermediate generative model generated in a prior iteration.

In some embodiments, the trained discriminative model may include a first trained discriminative model and a second trained discriminative model. The training process may include determining, based on the sample intermediate image and the reference image, a first evaluation value relating to a difference between the sample intermediate image and the reference image using the first trained discriminative model. The training process may include determining, based on the sample input image and the sample intermediate image, a second evaluation value relating to a difference between the sample input image and the sample intermediate image using the second trained discriminative model. The training process may include determining, based on the first evaluation value and the second evaluation value, the value of the cost function.

In some embodiments, the training process may include extracting at least one first shape associated with the sample input image and at least one second shape associated with the sample intermediate image. The training process may include determining, based on a difference between the at least one first shape and the at least one second shape, the second evaluation value using the second trained discriminative model.

According to another aspect of the present disclosure, a system may include at least one storage device storing a set of instructions, and at least one processor in communication with the at least one storage device. When executing the stored set of instructions, the at least one processor may cause the system to perform a method. The method may include obtaining a first image of a first resolution. The method may include generating a second image of a second resolution by processing, based on a trained machine learning model, the first image. The second resolution may be different from the first resolution.

In some embodiments, the method may include dividing the first image into a plurality of first sub-images. The method may include generating a plurality of second sub-images by processing, based on the trained machine learning model, the plurality of first sub-images. The method may include generating, based on the plurality of second sub-images, the second image.

In some embodiments, the trained machine learning model may be obtained according to a training process. The training process may include obtaining a plurality of groups of training samples. The training process may include generating the trained machine learning model by training a preliminary machine learning model using the plurality of groups of training samples. Each group of the plurality of groups of training samples may include a sample input image and a reference image. The sample input image and the reference image of the group may be of different resolutions.

In some embodiments, the training process may include performing a rigid registration operation on the sample input image and the reference image in each group of the plurality of groups of training samples.

In some embodiments, the trained machine learning model may be constructed based on a generative adversarial network (GAN).

In some embodiments, the trained machine learning model may include a trained generative model and a trained discriminative model. The training process may include generating the trained discriminative model by training a preliminary discriminative model using the plurality of groups of training samples. The training process may include generating, based on the trained discriminative model, the trained generative model by training a preliminary generative model using the plurality of groups of training samples.

In some embodiments, the training process may include initializing parameter values of the preliminary generative model. The training process may include training, based on the trained discriminative model, the preliminary generative model by iteratively updating, based on the plurality of groups of training samples, the parameter values of the preliminary generative model.

In some embodiments, the iteratively updating, based on the plurality of groups of training samples, the parameter values of the preliminary generative model may include performing an iterative process. For each iteration of the iterative process, the training process may include retrieving a group of training samples from the plurality of groups of training samples. The training process may include generating a sample intermediate image by inputting a sample input image of the group of training samples into the preliminary generative model or an intermediate generative model generated in a prior iteration. The training process may include determining a value of a cost function based on the trained discriminative model, the group of training samples, and the sample intermediate image. The training process may include, in response to a determination that the value of the cost function does not satisfy a preset condition, updating the preliminary generative model or the intermediate generative model by updating at least some of the parameter values of the preliminary generative model or the intermediate generative model generated in a prior iteration.

In some embodiments, the trained discriminative model may include a first trained discriminative model and a second trained discriminative model. The training process may include determining, based on the sample intermediate image and the reference image, a first evaluation value relating to a difference between the sample intermediate image and the reference image using the first trained discriminative model. The training process may include determining, based on the sample input image and the sample intermediate image, a second evaluation value relating to a difference between the sample input image and the sample intermediate image using the second trained discriminative model. The training process may include determining, based on the first evaluation value and the second evaluation value, the value of the cost function.

In some embodiments, the training process may include extracting at least one first shape associated with the sample input image and at least one second shape associated with the sample intermediate image. The training process may include determining, based on a difference between the at least one first shape and the at least one second shape, the second evaluation value using the second trained discriminative model.

In some embodiments, the first image or the second image may include at least one of a computed tomography (CT) image, a magnetic resonance imaging (MRI) image, a positron emission tomography (PET) image, an ultrasound (US) image, or an X-ray image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 9 is a flowchart illustrating an exemplary process for determining a trained machine learning model according to some embodiments of the present disclosure;

FIG. 12 is a flowchart illustrating an exemplary process for determining a trained machine learning model according to some embodiments of the present disclosure;

DETAILED DESCRIPTION

Figure 1:
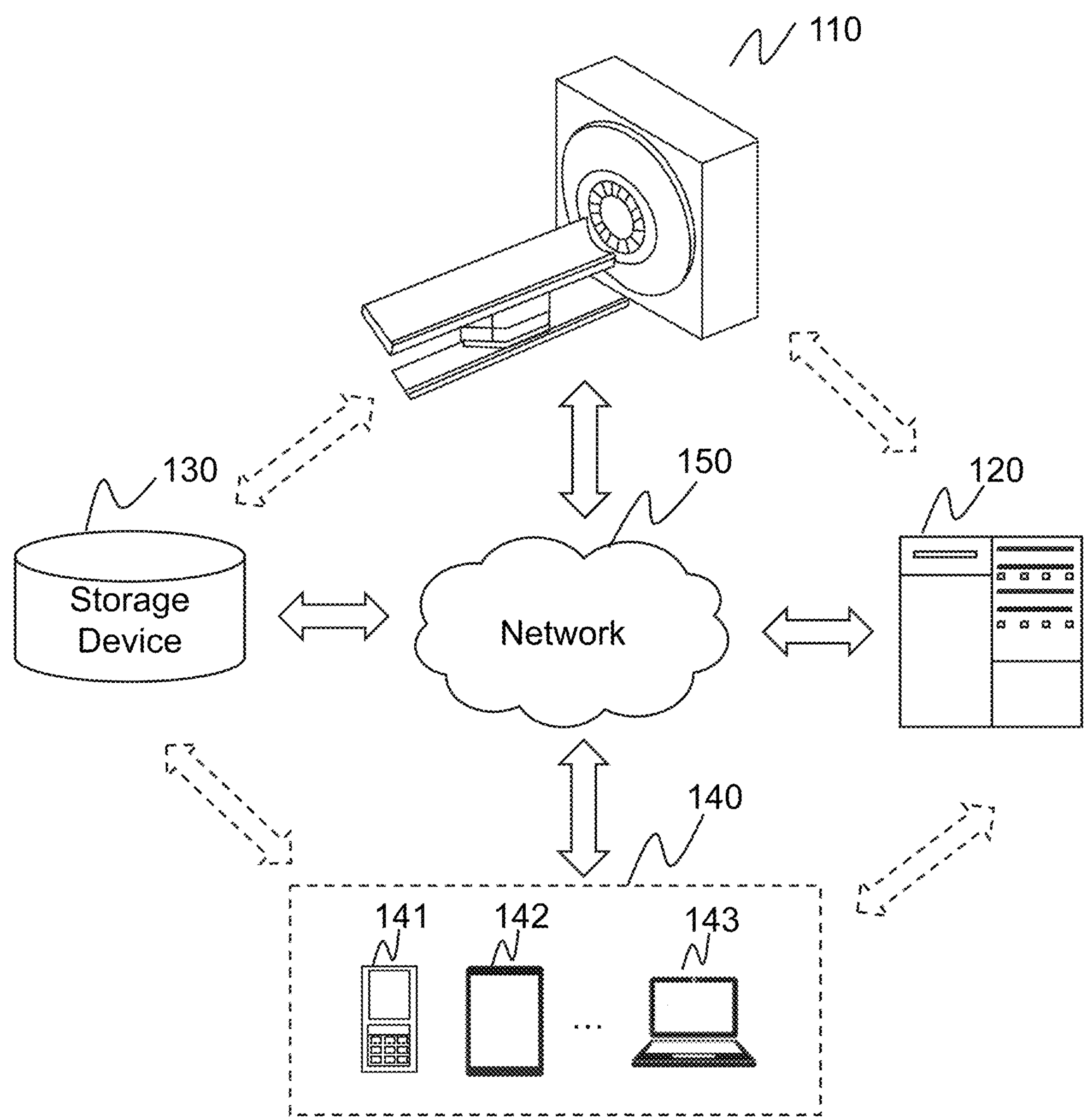
FIG. 1 is a schematic diagram illustrating an exemplary image processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

It will be understood that the terms "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

Spatial and functional relationships between elements are described using various terms, including "connected," "attached," and "mounted." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, attached, or positioned to another element, there are no intervening elements present. Other words used to describe the relationship between elements should be interpreted in a like fashion (e.g., "between," versus "directly between," "adjacent," versus "directly adjacent," etc.).

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

For illustration purposes, the following description is provided to help better understanding an artifact correction process. It is understood that this is not intended to limit the scope of the present disclosure. For persons having ordinary skills in the art, a certain amount of variations, changes and/or modifications may be deducted under the guidance of the present disclosure. Those variations, changes and/or modifications do not depart from the scope of the present disclosure.

Some embodiments of the present disclosure relate to a virtual multimodality imaging. Virtual multimodality imaging refers to a process of determining, reconstructing, and/or simulating a second image of a second modality based on a first image of a first modality. The second modality may be different from the first modality. For example, an ultrasound image may be reconstructed based on computed tomography (CT) image data. As another example, a CT image may be generated based on magnetic resonance (MR) image data. When hardware in a multimodality imaging device is incompatible, and/or image data generated by an imaging device with a specific modality is unavailable, the virtual multimodality imaging may be used as an alternative to some functions of a real imaging device to achieve the extraction of image information of different modalities from available image data, which may expand and enhance the functionality and application value of an existing imaging device.

CT imaging is widely used for both diagnostic and therapeutic purposes in various clinical applications. In a radiation therapy, a CT image may provide Hounsfield units of tissue of a subject, which may be used in dose calculation in treatment planning. Besides, a CT image may be used for attenuation correction of positron emission tomography (PET) in a PET/CT device or an MR/PET device. However, a subject (e.g., a patient) is exposed to radiation during CT imaging, which may damage normal body cells and further increase health risks, e.g., cancer. MRI may be a safe imaging protocol which also provides more anatomical details (e.g., a high resolution image with good contrast between different tissues) than CT for diagnostic purposes, but cannot be used for either dose calculation or attenuation correction. To reduce unnecessary radiation doses for a patient, it is clinically desired to estimate a CT image from an image of another modality, e.g., an MR image, in various applications. Recently, many researches have been focusing on estimating an image of a modality from another image of another modality, e.g., estimating a CT image using MRI data. A conventional technique is a registration-based technique. The registration-based technique may use registered MR training images and CT training images of a same subject. Specifically, a CT image corresponding to an MR image may be predicted based on registration relationships between a plurality of pairs of registered MR training images and CT training images. However, the performance of the registration-based technique may highly depend on the registration accuracy, and the image registration process may be complex and take a long processing time.

An aspect of the present disclosure relates to a system and method for image processing. A first image of a first modality may be obtained. A second image of a second modality may be generated by processing, based on a trained machine learning model, the first image. The second modality may be different from the first modality. In some embodiments, the trained machine learning model may be constructed based on a generative adversarial network (GAN). In some embodiments, the trained machine learning model (e.g., a trained GAN model) may be determined by training a preliminary machine learning model (e.g., a preliminary GAN model) using unregistered training samples of different modalities. In some embodiments, the trained machine learning model (e.g., the trained GAN model) may include a trained generative model and a trained discriminative model. The trained discriminative model may be configured to evaluate an output (e.g., a sample intermediate image) of a preliminary generative model (or an intermediate generative model) and provide an evaluation result (e.g., a value of a cost function) to the preliminary generative model (or the intermediate generative model). The preliminary generative model (or the intermediate generative model) may be adjusted based on the evaluation result to generate the trained generative model. The trained generative model may be configured to generate the second image of the second modality based on the first image of the first modality.

Another aspect of the present disclosure relates to a system and method for image processing. A first image of a first resolution may be obtained. A second image of a second resolution may be generated by processing, based on a trained machine learning model, the first image. The second resolution may be different from the first resolution. In some embodiments, the second resolution may be higher than the first resolution.

Another aspect of the present disclosure relates to a system and method for image processing. A first image of a first resolution and a first modality may be obtained. A second image of a second resolution and a second modality may be generated by processing, based on a trained machine learning model, the first image. The second resolution may be different from the first resolution. The second modality may be different from the first modality.

Accordingly, a second image of a second modality (and/or a second resolution) may be generated based on a first image of a first modality (and/or a second resolution) using the trained machine learning model without using registered training samples of different modalities (and/or resolutions). For example, a CT image may be generated (or predicted) based on a pre-obtained MR image using a trained machine learning model. The trained machine learning model may predict the CT image with a relatively high accuracy. With a trained machine learning model obtained based on deep learning (or neural network), the image processing process may be simplified, and accordingly the efficiency and the accuracy of the image processing process may be improved.

FIG. 1 is a schematic diagram illustrating an exemplary image processing system according to some embodiments of the present disclosure. As shown, the image processing system 100 may include an imaging device 110, a processing device 120, a storage device 130, one or more terminal(s) 140, and a network 150. In some embodiments, the imaging device 110, the processing device 120, the storage device 130, and/or the terminal(s) 140 may be connected to and/or communicate with each other via a wireless connection (e.g., the network 150), a wired connection, or a combination thereof. The image processing system 100 may include various types of connection between its components. For example, the imaging device 110 may be connected to the processing device 120 through the network 150, or connected to the processing device 120 directly as illustrated by the bidirectional dotted arrow connecting the imaging device 110 and the processing device 120 in FIG. 1. As another example, the terminal(s) 140 may be connected to the processing device 120 through the network 150, or connected to the processing device 120 directly as illustrated by the bidirectional dotted arrow connecting the terminal(s) 140 and the processing device 120 in FIG. 1. As still another example, the storage device 130 may be connected to the imaging device 110 through the network 150, or connected to the imaging device 110 directly as illustrated by the bidirectional dotted arrow connecting the imaging device 110 and the storage device 130 in FIG. 1. As still another example, the storage device 130 may be connected to the terminal(s) 140 through the network 150, or connected to the terminal(s) 140 directly as illustrated by the bidirectional dotted arrow connecting the terminal(s) 140 and the storage device 130 in FIG. 1.

The imaging device 110 may be configured to acquire imaging data relating to at least one part of a subject. The imaging data relating to at least one part of a subject may include an image (e.g., an image slice), projection data, or a combination thereof. In some embodiments, the imaging data may be a two-dimensional (2D) imaging data, a three-dimensional (3D) imaging data, a four-dimensional (4D) imaging data, or the like, or any combination thereof. The subject may be biological or non-biological. For example, the subject may include a patient, a man-made object, etc. As another example, the subject may include a specific portion, an organ, and/or tissue of the patient. For example, the subject may include the head, the neck, the thorax, the heart, the stomach, a blood vessel, soft tissue, a tumor, nodules, or the like, or any combination thereof.

In some embodiments, the imaging device 110 may include a single modality imaging device. For example, the imaging device 110 may include a positron emission tomography (PET) device, a single-photon emission computed tomography (SPECT) device, a magnetic resonance imaging (MRI) device (also referred to as an MR device, an MR scanner), a computed tomography (CT) device, an ultrasound (US) device, a X-ray imaging device, or the like, or any combination thereof. In some embodiments, the imaging device 110 may include a multi-modality imaging device. Exemplary multi-modality imaging devices may include a PET-CT device, a PET-MRI device, or the like, or a combination thereof. For example, the imaging device 110 may include a PET device and an MRI device. The PET device may scan a subject or a portion thereof that is located within its detection region and generate projection data relating to the subject or the portion thereof. The PET device may include a gantry, a detector, an electronics module, and/or other components not shown. The gantry may support one or more parts of the PET device, for example, the detector, the electronics module, and/or other components. The detector may detect radiation photons (e.g., γ photons) emitted from a subject being examined. The electronics module may collect and/or process electrical signals (e.g., scintillation pulses) generated by the detector. The electronics module may convert an analog signal (e.g., an electrical signal generated by the detector) relating to a radiation photon detected by the detector to a digital signal relating to a radiation event. As used herein, a radiation event (also referred to as a single event) may refer to an interaction between a radiation photon emitted from a subject and impinging on and detected by the detector. A pair of radiation photons (e.g., γ photons) interacting with two detector blocks along a line of response (LOR) within a coincidence time window may be determined as a coincidence event. A portion of the radiation photons (e.g., γ photons) emitted from a subject being examined may interact with tissue in the subject. The radiation photons (e.g., γ photons) interacting with tissue in the subject may be scattered or otherwise change its trajectory, that may affect the number or count of radiation photons (e.g., γ photons) detected by two detector blocks along a line of response (LOR) within a coincidence time window and the number or count of coincidence events.

The MRI device may scan a subject or a portion thereof that is located within its detection region and generate MR image data relating to the subject or the portion thereof. The MR image data may include k-space data, MR signals, an MR image, etc. The MR image data may be acquired by the MRI device via scanning the subject using a pulse sequence. Exemplary pulse sequences may include a spin-echo sequence, a gradient echo sequence, a diffusion sequence, an inversion recovery sequence, or the like, or any combination thereof. For example, the spin-echo sequence may include a fast spin-echo (FSE), a turbo spin-echo (TSE), a rapid acquisition with relaxation enhancement (RARE), a half-Fourier acquisition single-shot turbo spin-echo (HASTE), a turbo gradient spin echo (TGSE), or the like, or a combination thereof.

The processing device 120 may process data and/or information obtained from the imaging device 110, the storage device 130, and/or the terminal(s) 140. For example, the processing device 120 may obtain a first image of a first modality. As another example, the processing device 120 may generate a second image of a second modality by processing, based on a trained machine learning model, a first image of a first modality. The second modality may be different from the first modality. As still another example, the processing device 120 may obtain a first image of a first resolution. As still another example, the processing device 120 may generate a second image of a second resolution by processing, based on a trained machine learning model, a first image of a first resolution. The second resolution may be different from the first resolution. In some embodiments, the second resolution may be higher than the first resolution. As a still further example, the processing device 120 may determine a trained machine learning model. In some embodiments, the trained machine learning model may be updated from time to time, e.g., periodically or not, based on a sample set that is at least partially different from an original sample set from which an original trained machine learning model is determined. For instance, the trained machine learning model may be updated based on a sample set including new samples that are not in the original sample set, samples processed using the machine learning model in connection with the original trained machine learning model of a prior version, or the like, or a combination thereof. In some embodiments, the determination and/or updating of the trained machine learning model may be performed on a processing device, while the application of the trained machine learning model may be performed on a different processing device. In some embodiments, the determination and/or updating of the trained machine learning model may be performed on a processing device of a system different than the image processing system 100 or a server different than a server including the processing device 120 on which the application of the trained machine learning model is performed. For instance, the determination and/or updating of the trained machine learning model may be performed on a first system of a vendor who provides and/or maintains such a machine learning model and/or has access to training samples used to determine and/or update the trained machine learning model, while image processing based on the provided machine learning model may be performed on a second system of a client of the vendor. In some embodiments, the determination and/or updating of the trained machine learning model may be performed online in response to a request for image processing. In some embodiments, the determination and/or updating of the trained machine learning model may be performed offline.

In some embodiments, the processing device 120 may be a single server or a server group. The server group may be centralized or distributed. In some embodiments, the processing device 120 may be local or remote. For example, the processing device 120 may access information and/or data from the imaging device 110, the storage device 130, and/or the terminal(s) 140 via the network 150. As another example, the processing device 120 may be directly connected to the imaging device 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be part of the terminal 140. In some embodiments, the processing device 120 may be part of the imaging device 110.

The storage device 130 may store data, instructions, and/or any other information. In some embodiments, the storage device 130 may store data obtained from the imaging device 110, the processing device 120, and/or the terminal(s) 140. The data may include image data acquired by the processing device 120, algorithms and/or models for processing the image data, etc. For example, the storage device 130 may store a first image of a first modality (and/or a first resolution) obtained from an imaging device (e.g., the imaging device 110). As another example, the storage device 130 may store a second image of a second modality (and/or a second resolution) determined by the processing device 120. As still another example, the storage device 130 may store a trained machine learning model. In some embodiments, the storage device 130 may store data and/or instructions that the processing device 120 and/or the terminal 140 may execute or use to perform exemplary methods described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the image processing system 100 (e.g., the processing device 120, the terminal(s) 140). One or more components in the image processing system 100 may access the data or instructions stored in the storage device 130 via the network 150. In some embodiments, the storage device 130 may be integrated into the imaging device 110.

The terminal(s) 140 may be connected to and/or communicate with the imaging device 110, the processing device 120, and/or the storage device 130. In some embodiments, the terminal 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal 140 may include an input device, an output device, etc. The input device may include alphanumeric and other keys that may be input via a keyboard, a touchscreen (for example, with haptics or tactile feedback), a speech input, an eye tracking input, a brain monitoring system, or any other comparable input mechanism. Other types of the input device may include a cursor control device, such as a mouse, a trackball, or cursor direction keys, etc. The output device may include a display, a printer, or the like, or any combination thereof.

The network 150 may include any suitable network that can facilitate the exchange of information and/or data for the image processing system 100. In some embodiments, one or more components of the image processing system 100 (e.g., the imaging device 110, the processing device 120, the storage device 130, the terminal(s) 140, etc.) may communicate information and/or data with one or more other components of the image processing system 100 via the network 150. For example, the processing device 120 and/or the terminal 140 may obtain an image from the imaging device 110 via the network 150. As another example, the processing device 120 and/or the terminal 140 may obtain information stored in the storage device 130 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the image processing system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure.

Figure 2:
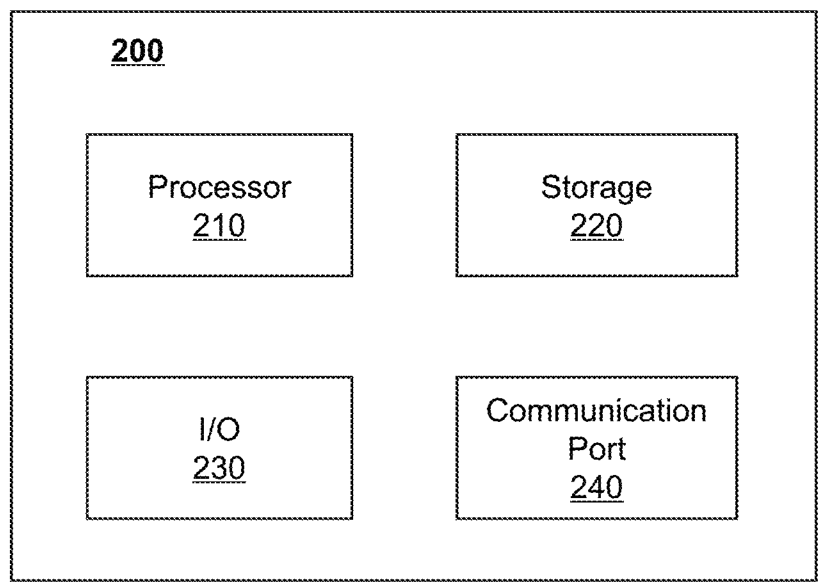
FIG. 2 is a schematic diagram illustrating exemplary hardware and/or software components of an exemplary computing device on which the processing device may be implemented according to some embodiments of the present disclosure.

FIG. 2 is a schematic diagram illustrating exemplary hardware and/or software components of an exemplary computing device 200 on which the processing device 120 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process imaging data obtained from the imaging device 110, the terminal(s) 140, the storage device 130, and/or any other component of the image processing system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the imaging device 110, the terminal(s) 140, the storage device 130, and/or any other component of the image processing system 100. The storage 220 may be similar to the storage device 130 described in connection with FIG. 1, and the detailed descriptions are not repeated here.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touchscreen, a microphone, a sound recording device, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touchscreen, or the like, or a combination thereof.

The communication port 240 may be connected to a network (e.g., the network 150) to facilitate data communications. The communication port 240 may establish connections between the processing device 120 and the imaging device 110, the terminal(s) 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. In some embodiments, the communication port 240 may be and/or include a standardized communication port, such as RS232, RS485. In some embodiments, the communication port 240 may be a specially designed communication port. For example, the communication port 240 may be designed in accordance with the digital imaging and communications in medicine (DICOM) protocol.

Figure 3:
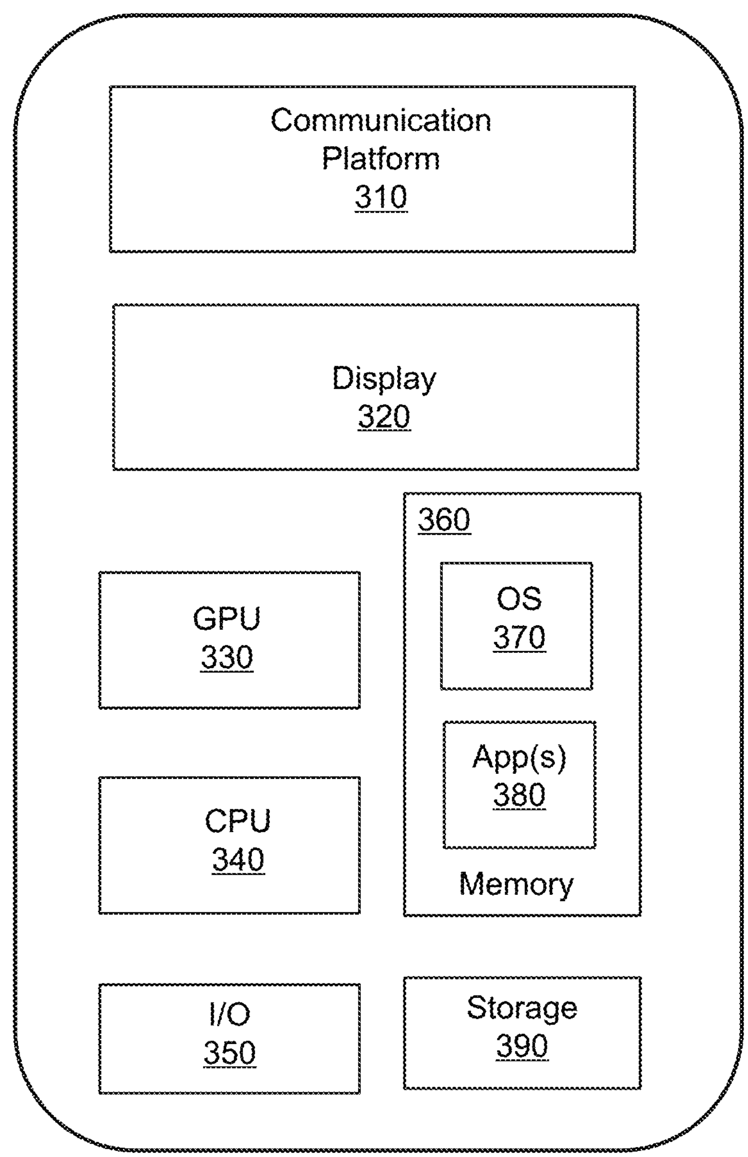
FIG. 3 is a schematic diagram illustrating exemplary hardware and/or software components of an exemplary mobile device on which the terminal(s) may be implemented according to some embodiments of the present disclosure.

FIG. 3 is a schematic diagram illustrating exemplary hardware and/or software components of an exemplary mobile device 300 on which the terminal(s) 140 may be implemented according to some embodiments of the present disclosure.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, the communication platform 310 may be configured to establish a connection between the mobile device 300 and other components of the image processing system 100, and enable data and/or signal to be transmitted between the mobile device 300 and other components of the image processing system 100. For example, the communication platform 310 may establish a wireless connection between the mobile device 300 and the imaging device 110, and/or the processing device 120. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. The communication platform 310 may also enable the data and/or signal between the mobile device 300 and other components of the image processing system 100. For example, the communication platform 310 may transmit data and/or signals inputted by a user to other components of the image processing system 100. The inputted data and/or signals may include a user instruction. As another example, the communication platform 310 may receive data and/or signals transmitted from the processing device 120. The received data and/or signals may include imaging data acquired by a detector of the imaging device 110.

In some embodiments, a mobile operating system (OS) 370 (e.g., iOS™ Android™, Windows Phone™, etc.) and one or more applications (App(s)) 380 may be loaded into the memory 360 from the storage 390 in order to be executed by the CPU 340. The applications 380 may include a browser or any other suitable mobile apps for receiving and rendering information respect to an image processing operation or other information from the processing device 120. User interactions with the information stream may be achieved via the I/O 350 and provided to the processing device 120 and/or other components of the image processing system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
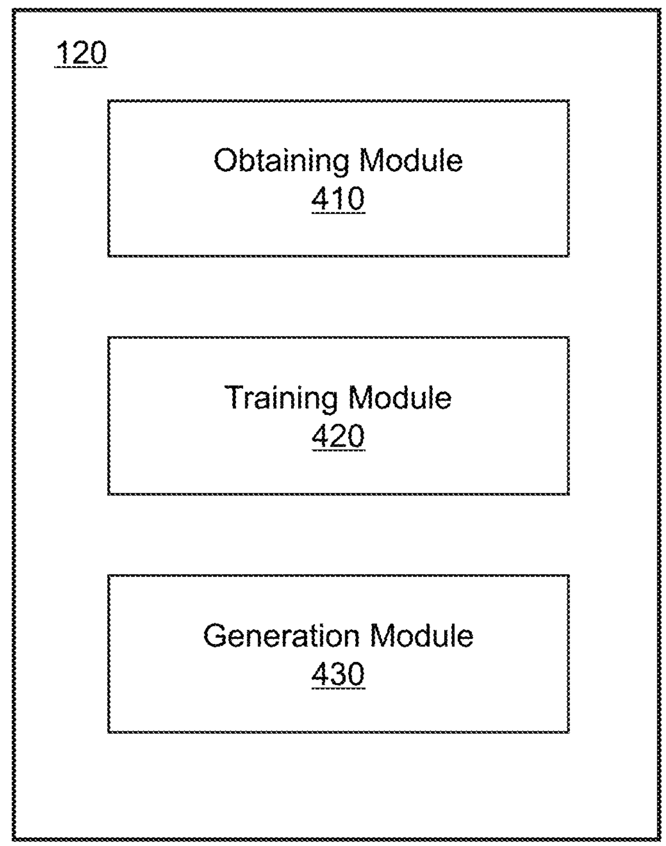
FIG. 4 is a schematic diagram illustrating an exemplary processing device according to some embodiments of the present disclosure.

FIG. 4 is a schematic diagram illustrating an exemplary processing device according to some embodiments of the present disclosure. In some embodiments, the processing device 120 may include an obtaining module 410, a training module 420, and a generation module 430. The modules may be hardware circuits of at least part of the processing device 120. The modules may also be implemented as an application or set of instructions read and executed by the processing device 120. Further, the modules may be any combination of the hardware circuits and the application/instructions. For example, the modules may be part of the processing device 120 when the processing device 120 is executing the application or set of instructions.

The obtaining module 410 may be configured to obtain data and/or information associated with the image processing system 100. The data and/or information associated with the image processing system 100 may include an image, a preliminary machine learning model, a trained machine learning model, a plurality of groups of training samples, or the like, or any combination thereof. For example, the obtaining module 410 may obtain a first image of a first modality (and/or a first resolution). As another example, the obtaining module 410 may obtain a plurality of groups of training samples. Each group of the plurality of groups of training samples may include a sample input image and a reference image. The sample input image and the reference image of the group may be of different modalities (and/or different resolutions). In some embodiments, the sample input image and the reference image of the group may be unregistered. As still another example, the obtaining module 410 may retrieve a group of training samples from a plurality of groups of training samples.

In some embodiments, the obtaining module 410 may obtain the data and/or information associated with the image processing system 100 from one or more components (e.g., the imaging device 110, the storage device 130, the terminal 140 of the image processing system 100 or an external storage device via the network 150.

The training module 420 may be configured to determine a trained machine learning model. The trained machine learning model may be configured to generate a second image of a second modality (and/or a second resolution) based on a first image of a first modality (and/or a first resolution). The second modality (or the second resolution) may be different from the first modality (or the first resolution). For example, the training module 420 may generate a trained discriminative model by training a preliminary discriminative model using a plurality of groups of training samples. The training module 420 may generate, based on a trained discriminative model, a trained generative model by training a preliminary generative model using a plurality of groups of training samples. More descriptions of the determination of the trained machine learning model may be found elsewhere in the present disclosure (e.g., FIGS. 7, 9, 10, 11, 12, and descriptions thereof). In some embodiments, the training module 420 may include a generation unit 510, a first evaluation value determination unit 520, a second evaluation value determination unit 530, and an updating unit 540, as described elsewhere in the present disclosure (e.g., FIG. 5 and descriptions thereof).

The generation module 430 may be configured to generate data and/or information associated with the image processing system 100. The data and/or information associated with the image processing system 100 may include an image, a trained machine learning model, or the like, or any combination thereof. In some embodiments, the generation module 430 may generate a second image of a second modality (and/or a second resolution) by processing, based on a trained machine learning model, a first image of a first modality (and/or a first resolution). The second modality (or the second resolution) may be different from the first modality (or the first resolution). In some embodiments, the generation module 430 may include a division unit 610, a first generation unit 620, and a second generation unit 630, as described elsewhere in the present disclosure (e.g., FIG. 6 and descriptions thereof).

It should be noted that the above description of the processing device 120 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be combined into a single module. For example, the obtaining module 410 and the generation module 430 may be combined into a single module, which may both obtain a first image and generate a second image. In some embodiments, one or more modules may be added or omitted in the processing device 120. For example, the processing device 120 may further include a storage module (not shown in FIG. 4) configured to store data and/or information (e.g., the first image, the second image, the trained machine learning model) associated with the image processing system 100. As another example, the training module 420 may be unnecessary and the trained machine learning model may be obtained from a storage device (e.g., the storage device 130).

Figure 5:
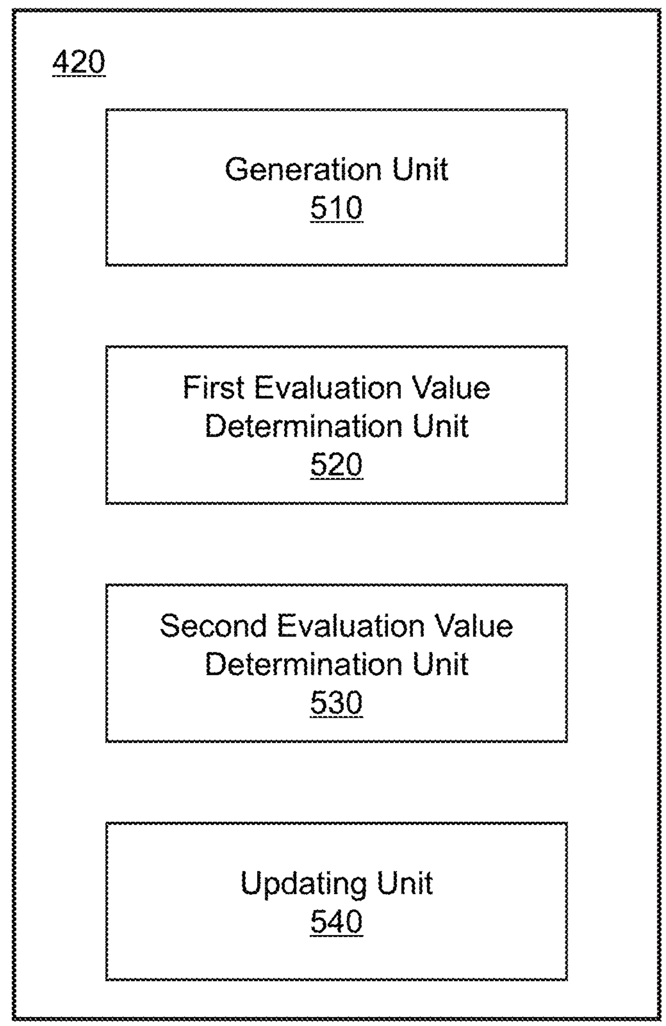
FIG. 5 is a schematic diagram illustrating an exemplary training module according to some embodiments of the present disclosure.

FIG. 5 is a schematic diagram illustrating an exemplary training module according to some embodiments of the present disclosure. In some embodiments, the training module 420 may include a generation unit 510, a first evaluation value determination unit 520, a second evaluation value determination unit 530, and an updating unit 540. The units may be hardware circuits of at least part of the training module 420. The units may also be implemented as an application or set of instructions read and executed by the training module 420. Further, the units may be any combination of the hardware circuits and the application/instructions. For example, the units may be part of the training module 420 when the training module 420 is executing the application or set of instructions.

The generation unit 510 may be configured to generate a sample intermediate image. In some embodiments, the generation unit 510 may generate a sample intermediate image by inputting a sample input image of a group of training samples into a preliminary generative model or an intermediate generative model. For example, the generation unit 510 may input a sample input image into a preliminary generative model or an intermediate generative model. The preliminary generative model or the intermediate generative model may output a sample intermediate image based on the inputted sample input image.

The first evaluation value determination unit 520 may be configured to determine a first evaluation value (also referred to as a first classification accuracy) relating to a difference between a sample intermediate image and a reference image. In some embodiments, the first evaluation value determination unit 520 may determine, based on a sample intermediate image and a reference image, a first evaluation value relating to a difference between the sample intermediate image and the reference image using a first trained discriminative model. For example, the first evaluation value determination unit 520 may input a sample intermediate image and a reference image into a first trained discriminative model. The first trained discriminative model may extract at least one first feature in the sample intermediate image and at least one second feature in the reference image according to one or more feature extraction algorithms. The first trained discriminative model may determine the first evaluation value by comparing the at least one first feature in the sample intermediate image and the at least one second feature in the reference image. More descriptions of the determination of the first evaluation value may be found elsewhere in the present disclosure (e.g., FIG. 10 and descriptions thereof).

The second evaluation value determination unit 530 may be configured to determine a second evaluation value (also referred to as a second classification accuracy) relating to a difference between a sample input image and a sample intermediate image. In some embodiments, the second evaluation value determination unit 530 may determine, based on a sample input image and a sample intermediate image, a second evaluation value relating to a difference between the sample input image and the sample intermediate image using a second trained discriminative model. For example, the second evaluation value determination unit 530 may input a sample intermediate image and a sample input image into a second trained discriminative model. The second trained discriminative model may extract at least one first shape associated with the sample input image and at least one second shape associated with the sample intermediate image. The second evaluation value determination unit 530 may determine, based on a difference between the at least one first shape and the at least one second shape, a second evaluation value using the second trained discriminative model. As another example, the second evaluation value determination unit 530 may extract at least one first shape associated with a sample input image and at least one second shape associated with a sample intermediate image using a shape extractor. The second evaluation value determination unit 530 may input the at least one first shape and the at least one second shape into a second trained discriminative model. The second evaluation value determination unit 530 may determine, based on a difference between the at least one first shape and the at least one second shape, a second evaluation value using the second trained discriminative model. More descriptions of the determination of the second evaluation value may be found elsewhere in the present disclosure (e.g., FIG. 10 and descriptions thereof).

The updating unit 540 may be configured to update a preliminary machine learning model or an intermediate machine learning model. In some embodiments, the updating unit 540 may determine a value of a cost function based on a first evaluation value and a second evaluation value. More descriptions of the determination of the value of the cost function may be found elsewhere in the present disclosure (e.g., FIG. 10 and descriptions thereof). In some embodiments, the updating unit 540 may update, based on a value of a cost function, a preliminary generative model or an intermediate generative model generated in a prior iteration by updating at least some of parameter values of the preliminary generative model or the intermediate generative model. For example, the updating unit 540 may adjust and/or update the at least some of the parameter values of the preliminary generative model or the intermediate generative model to cause a value of a cost function less than a threshold. More descriptions of the update of the preliminary machine learning model or the intermediate machine learning model may be found elsewhere in the present disclosure (e.g., FIG. 10 and descriptions thereof).

It should be noted that the above description of the training module 420 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more units may be combined into a single unit. For example, the first evaluation value determination unit 520 and the second evaluation value determination unit 530 may be combined into a single unit, which may both determine a first evaluation value and a second evaluation value. In some embodiments, the training module may further include one or more other units. For example, the training module 420 may further include a registration unit (not shown). The registration unit may perform a rigid registration operation on a sample input image and a reference image in each group of a plurality of groups of training samples.

Figure 6:
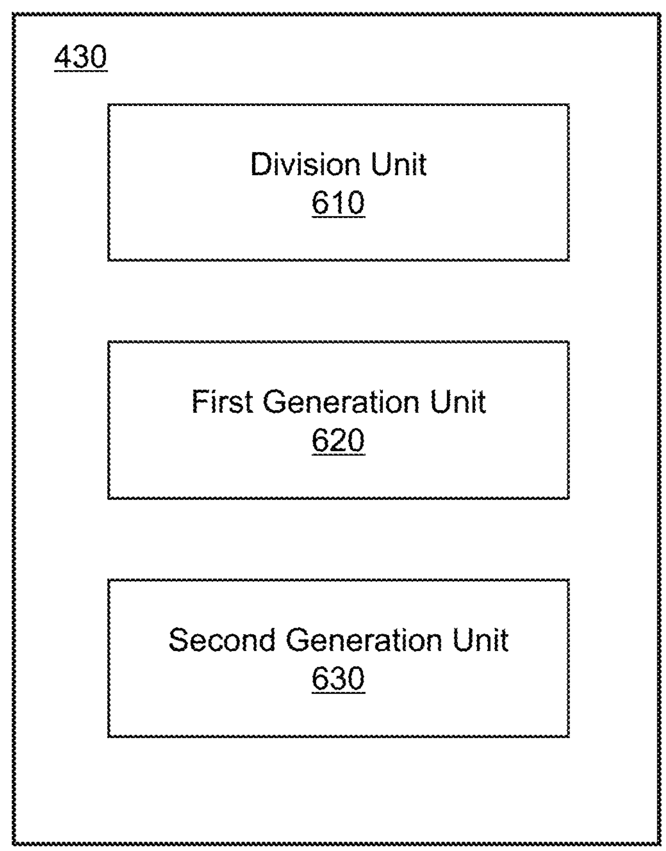
FIG. 6 is a schematic diagram illustrating an exemplary generation module according to some embodiments of the present disclosure.

FIG. 6 is a schematic diagram illustrating an exemplary generation module according to some embodiments of the present disclosure. In some embodiments, the generation module 430 may include a division unit 610, a first generation unit 620, and a second generation unit 630. The units may be hardware circuits of at least part of the generation module 430. The units may also be implemented as an application or set of instructions read and executed by the generation module 430. Further, the units may be any combination of the hardware circuits and the application/instructions. For example, the units may be part of the generation module 430 when the generation module 430 is executing the application or set of instructions.

The division unit 610 may be configured to divide an image. In some embodiments, the division unit 610 may divide a first image into a plurality of first sub-images. In some embodiments, the division unit 610 may divide a first image into a plurality of first sub-images according to an actual requirement. The first sub-image may have any size. The sizes of different first sub-images may be the same or different. More descriptions of the division of the first image may be found elsewhere in the present disclosure (e.g., operation 810 in FIG. 8, and descriptions thereof).

The first generation unit 620 may be configured to generate a second sub-image of a second modality (and/or a second resolution) based on a first sub-image of a first modality (and/or a first resolution). The second modality (or the second resolution) may be different from a first modality (or the first resolution). In some embodiments, the first generation unit 620 may generate a plurality of second sub-images by processing, based on a trained machine learning model, a plurality of first sub-images. For example, the first generation unit 620 may input each first sub-image of a plurality of first sub-images into a trained machine learning model. The trained machine learning model may output a second sub-image corresponding to the each first sub-image of the plurality of first sub-images. More descriptions of the generation of the second sub-image may be found elsewhere in the present disclosure (e.g., operation 820 in FIG. 8, and descriptions thereof).

The second generation unit 630 may be configured to generate an image based on a plurality of sub-images. In some embodiments, the second generation unit 630 may generate a second image based on a plurality of second sub-images. For example, the second generation unit 630 may generate the second image (e.g., a 3D image) by combining a plurality of second sub-images (e.g., a plurality of 2D sub-images) according to one or more image stitching algorithms. More descriptions of the generation of the second image may be found elsewhere in the present disclosure (e.g., operation 830 in FIG. 8, and descriptions thereof).

It should be noted that the above description of the generation module 430 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more units may be combined into a single unit. For example, the first generation unit 620 and the second generation unit 630 may be combined into a single unit, which may both generate a plurality of second sub-images and a second image.

Figure 7:
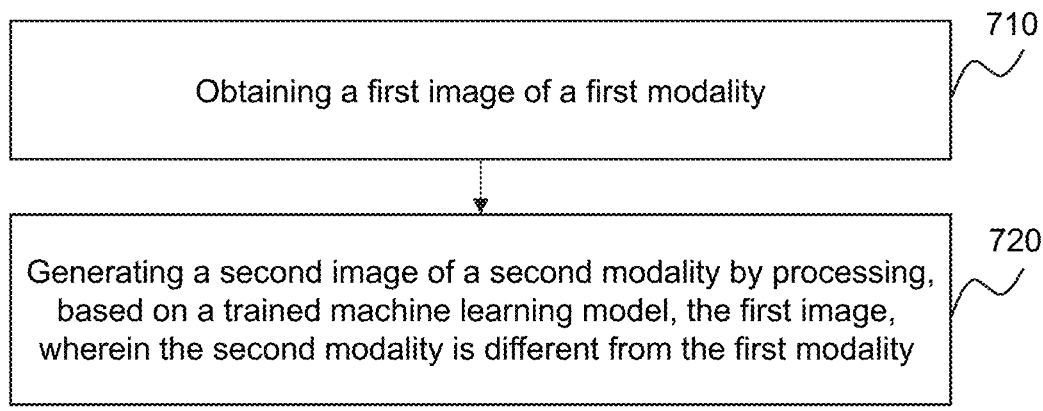
FIG. 7 is a flowchart illustrating an exemplary process for generating a second image of a second modality based on a first image of a first modality according to some embodiments of the present disclosure.

FIG. 7 is a flowchart illustrating an exemplary process for generating a second image of a second modality based on a first image of a first modality according to some embodiments of the present disclosure. In some embodiments, the process 700 may be implemented in the image processing system 100 illustrated in FIG. 1. For example, the process 700 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 710, the processing device 120 (e.g., the obtaining module 410) may obtain a first image of a first modality.

In some embodiments, the processing device 120 may obtain the first image from one or more components (e.g., the imaging device 110, the terminal 140, and/or the storage device 130) of the image processing system 100 or an external storage device via the network 150. For example, the imaging device 110 may transmit acquired imaging data (e.g., projection data) to the storage device 130, or any other storage device for storage. The processing device 120 may obtain the imaging data from the storage device 130, or any other storage device and reconstruct the first image based on the imaging data. As another example, the processing device 120 may obtain the first image from the imaging device 110 directly. In some embodiments, the processing device 120 may obtain the first image from the I/O 230 of the computing device 200 via the communication port 240, and/or the I/O 350 of the mobile device 300 via the communication platform 310.

As used herein, a modality of a specific image (e.g., the first image) of a specific subject may be defined by an imaging device acquiring the specific image, one or more scanning parameters used by the imaging device scanning the specific subject, an image reconstruction technique for generating the specific image, or the like, or any combination thereof. The subject may be biological or non-biological. For example, the subject may include a patient, a man-made object, or the like, as described elsewhere in the present disclosure (e.g., FIG. 1 and the descriptions thereof). Different images of a same subject acquired by different imaging devices may correspond to different modalities. For example, an MR image of a specific subject obtained by an MRI device may be considered a different modality than a PET image of the specific subject obtained by a PET device. Different images of a same subject generated using different image reconstruction techniques based on same imaging data (e.g., projection data) may correspond to different modalities. For example, an image generated using an image reconstruction technique (e.g., a back-projection technique) based on imaging data (e.g., projection data) may be considered a different modality than another image generated using another image reconstruction technique (e.g., an iteration reconstruction technique) based on the same imaging data (e.g., projection data). Different images generated using a same imaging device but based on different scanning parameters may correspond to different modalities. For example, an MR image generated based on k-space data acquired by an MRI device according to a spin-echo sequence may be considered a different modality than another MR image generated based on k-space data acquired by the same MRI device according to a gradient echo sequence.

In 720, the processing device 120 (e.g., the generation module 430) may generate a second image of a second modality by processing, based on a trained machine learning model, the first image. The second modality may be different from the first modality.

In some embodiments, the first image and/or the second image may be a medical image. For example, the first image and/or the second image may be associated with a specific portion (e.g., the head, the thorax, the abdomen), an organ (e.g., a lung, the liver, the heart, the stomach), and/or tissue (e.g., muscle tissue, connective tissue, epithelial tissue, nervous tissue) of a human or an animal.

In some embodiments, the first image and/or the second image may include a CT image, an MR image, a PET image, an ultrasound (US) image, an X-ray image, or the like. In some embodiments, the first image and/or the second image may include a two-dimensional (2D) image, a three-dimensional (3D) image, a four-dimensional (4D) image, or the like.

In some embodiments, the second modality may be different from the first modality. For example, the first image may be an MR image acquired by an MRI device, and the second image may be a CT image, a PET image, an X-ray image, a US image, or the like. As another example, the first image may be a CT image acquired by a CT device, and the second image may be an MR image, a PET image, an X-ray image, a US image, or the like.

In some embodiments, the trained machine learning model may be configured to generate the second image of the second modality based on the first image of the first modality. In some embodiments, the trained machine learning model may be constructed based on a convolutional neural network model (CNN), a fully convolutional neural network (FCN) model, a generative adversarial network (GAN) model, or the like, or any combination thereof. For illustration purposes, an MR image-to-CT image translation process is taken as an example, the processing device 120 may obtain an MR image acquired by an MRI device. The processing device 120 may input the MR image into the trained machine learning model (e.g., a trained GAN model). The trained machine learning model (e.g., the trained GAN model) may output a CT image corresponding to the MR image.

In some embodiments, the trained machine learning model may be determined by training a preliminary machine learning model. In some embodiments, the preliminary machine learning model may include a plurality of parameters. Exemplary parameters of the preliminary machine learning model may include a size of a kernel of a layer, a total count (or number) of layers, a count (or number) of nodes in each layer, a learning rate, a batch size, an epoch, a connected weight between two connected nodes, a bias vector relating to a node, or the like. One or more parameter values of the plurality of parameters may be altered during the training of the preliminary machine learning model using a plurality of groups of training samples. Each group of the plurality of groups of training samples may include a sample input image and a reference image. The sample input image and the reference image of the group may be of different modalities. In some embodiments, the preliminary machine learning model may be trained based on the plurality of groups of training samples using a training algorithm. Exemplary training algorithms may include a gradient descent algorithm, Newton's algorithm, a Quasi-Newton algorithm, a Levenberg-Marquardt algorithm, a conjugate gradient algorithm, a generative adversarial learning algorithm, or the like.

In some embodiments, the trained machine learning model may be determined by performing a plurality of iterations to iteratively update one or more parameter values of the preliminary machine learning model. Before the plurality of iterations start, the parameter values of the preliminary machine learning model may be initialized. For example, the connected weights and/or the bias vector of nodes of the preliminary machine learning model may be initialized by assigning random values in a range, e.g., the range from −1 to 1. As another example, all the connected weights of the preliminary machine learning model may be assigned a same value in the range from −1 to 1, for example, 0. As still another example, the bias vector of nodes in the preliminary machine learning model may be initialized by assigning random values in a range from 0 to 1. In some embodiments, the parameter values of the preliminary machine learning model may be initialized based on a Gaussian random algorithm, a Xavier algorithm, etc.

For each of the plurality of iterations, a specific group of training samples may first be input into the preliminary machine learning model. For example, a specific sample input image in a specific group of training samples may be inputted into an input layer of the preliminary machine learning model, and a reference image corresponding to the specific sample input image may be inputted into an output layer of the preliminary machine learning model as a desired output of the preliminary machine learning model. In some embodiments, the specific sample input image and the reference image in the specific group of training samples may be unregistered. The preliminary machine learning model may extract one or more image features (e.g., a low-level feature (e.g., an edge feature, a texture feature), a high-level feature (e.g., a semantic feature), or a complicated feature (e.g., a deep hierarchical feature) included in the specific group of training sample. Based on the extracted image features, the preliminary machine learning model may determine a predicted output (i.e., a sample intermediate image) of the specific group of the training sample. The predicted output (i.e., the sample intermediate image) of the specific group of training samples may then be compared with the reference image of the specific group of training samples based on a cost function. The value of the cost function may be determined based on the extracted image features determined by the preliminary machine learning model being trained. As used herein, a cost function of a machine learning model may be configured to assess a difference between a predicted output (e.g., a sample intermediate image) of the machine learning model and a desired output (e.g., a reference image). If the value of the cost function exceeds a threshold in a current iteration, parameter values of the preliminary machine learning model may be adjusted and/or updated in order to decrease the value of the cost function (i.e., the difference between the sample intermediate image and the reference image) to smaller than the threshold, and an intermediate machine learning model may be generated. Accordingly, in the next iteration, another group of training samples may be input into the intermediate machine learning model to train the intermediate machine learning model as described above.

The plurality of iterations may be performed to update the parameter values of the preliminary machine learning model (or the intermediate machine learning model) until a termination condition is satisfied. The termination condition may provide an indication of whether the preliminary machine learning model (or the intermediate machine learning model) is sufficiently trained. The termination condition may relate to the cost function or an iteration count of the iterative process or training process. For example, the termination condition may be satisfied if the value of the cost function associated with the preliminary machine learning model (or the intermediate machine learning model) is minimal or smaller than a threshold (e.g., a constant). As another example, the termination condition may be satisfied if the value of the cost function converges. The convergence may be deemed to have occurred if the variation of the values of the cost function in two or more consecutive iterations is smaller than a threshold (e.g., a constant). As still another example, the termination condition may be satisfied when a specified number (or count) of iterations are performed in the training process. The trained machine learning model may be determined based on the updated parameter values.

It should be noted that, in response to a determination that the value of the cost function associated with the preliminary machine learning model (or the intermediate machine learning model) is equal to the threshold (e.g., the constant), the processing device 120 may either determine that the termination condition is satisfied or determine that the termination condition is not satisfied.

In some embodiments, the trained machine learning model (e.g., a trained GAN model) may include a trained generative model and a trained discriminative model connected with the trained generative model. The trained discriminative model may include a first trained discriminative model and a second trained discriminative model. The trained discriminative model may be determined by training a preliminary discriminative model using a plurality of groups of training samples. The trained generative model may be generated, based on the trained discriminative model, by training a preliminary generative model using the plurality of groups of training samples. For example, the preliminary generative model (or an intermediate generative model) may generated an output (e.g., a sample intermediate image) based on an input (e.g., a sample input image). The trained discriminative model may evaluate the output (e.g., the sample intermediate image) of the preliminary generative model (or the intermediate generative model) and send an evaluation result (e.g., a value of a cost function) to the preliminary generative model (or the intermediate generative model). The preliminary generative model (or the intermediate generative model) may be updated based on the evaluation result to generate the trained generative model. The trained generative model may be configured to generate the second image of the second modality based on the first image of the first modality. More descriptions of the determination of the trained machine learning model may be found elsewhere in the present disclosure (e.g., FIGS. 9, 10, and descriptions thereof).

In some embodiments, the processing device 120 may retrieve the trained machine learning model from the storage device 130, the terminals(s) 140, or any other storage device. For example, the trained machine learning model may be obtained by training a preliminary machine learning model offline using a processing device different from or same as the processing device 120. The trained machine learning model may be stored in the storage device 130, the terminals (s) 140, or any other storage device. The processing device 120 may retrieve the trained machine learning model from the storage device 130, the terminals(s) 140, or any other storage device in response to receipt of a request for image processing.

According to some embodiments of the present disclosure, after the first image of the first modality is obtained, the processing device 120 may input the first image into the trained machine learning model. The trained machine learning model may output the second image of the second modality based on the first image. Accordingly, the processing device 120 may determine the second image of the second modality by processing the first image of the first modality using the trained machine learning model without using registered training samples of different modalities. Therefore, the time for image processing may be reduced and the difficulty of image processing may be decreased. The image processing process may be simplified, and accordingly the efficiency and/or the accuracy of the image processing process may be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, a first resolution of the first image may be different from a second resolution of the second image. As used herein, a resolution of an image (e.g., the first image, the second image) may refer to a number (or count) of pixels displayed in one unit area (e.g., one square inch, one square centimeter) of the image. The trained machine learning model may be configured to generate the second image of the second modality and the second resolution based on the first image of the first modality and the first resolution. For example, the processing device 120 may obtain an MR image acquired by an MRI device with a resolution of 512 pixels per inch (ppi). The processing device 120 may input the MR image into the trained machine learning model (e.g., a trained GAN model). The trained machine learning model (e.g., the trained GAN model) may output a CT image corresponding to the MR image with a resolution of 1024 ppi.

Figure 8:
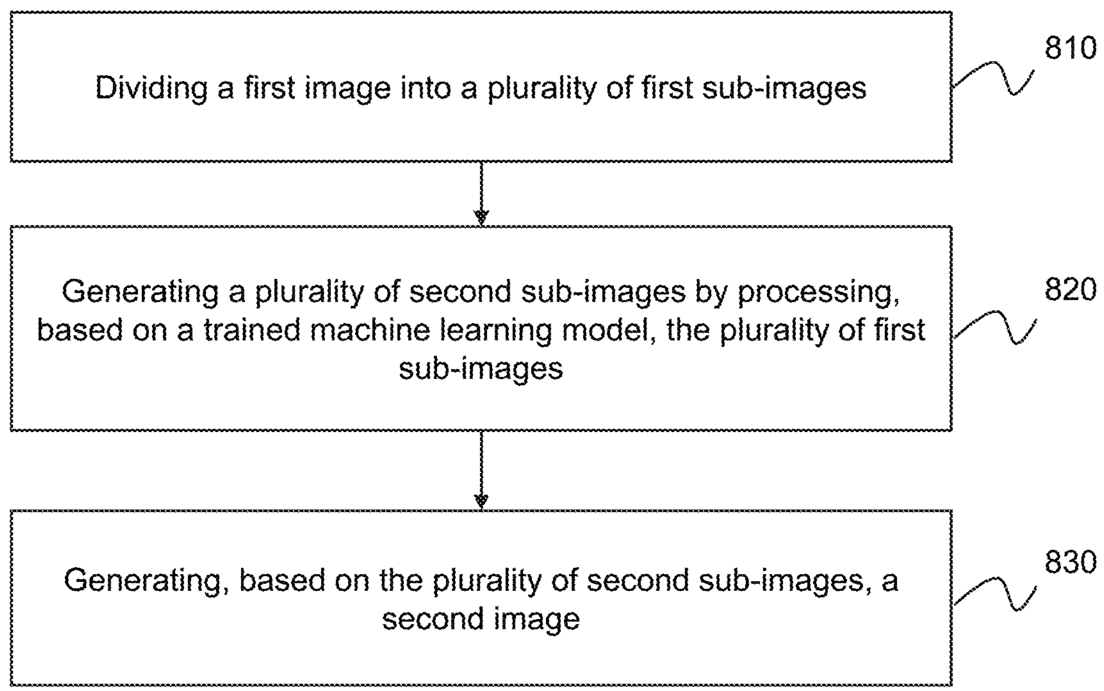
FIG. 8 is a flowchart illustrating an exemplary process for generating a second image of a second modality based on a first image of a first modality according to some embodiments of the present disclosure.

FIG. 8 is a flowchart illustrating an exemplary process for generating a second image of a second modality based on a first image of a first modality according to some embodiments of the present disclosure. In some embodiments, the process 800 may be implemented in the image processing system 100 illustrated in FIG. 1. For example, the process 800 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 810, the processing device 120 (e.g., the division unit 610) may divide a first image into a plurality of first sub-images.

In some embodiments, the first image may be a medical image. In some embodiments, the first image may be a CT image, an MR image, a PET image, a US image, an X-ray image, or the like. In some embodiments, the first image may be a 2D image, a 3D image, a 4D image, or the like.

In some embodiments, the processing device 120 may divide the first image into the plurality of first sub-images according to an actual requirement. The first sub-image may have any size. The sizes of different first sub-images may be the same or different. For example, the processing device 120 may uniformly divide the first image into the plurality of first sub-images with a same size of K pixels×K pixels. K may be any positive number, for example, 5, 10, 100, and 200.

In some embodiments, the first sub-image may be a 2D image, a 3D image, a 4D image, or the like. For example, if the first image is a 3D image, the first sub-image may be a 2D image or a 3D image.

In 820, the processing device 120 (e.g., the first generation unit 620) may generate a plurality of second sub-images by processing, based on a trained machine learning model, the plurality of first sub-images.

In some embodiments, a second modality of the second sub-image may be different from a first modality of the first sub-image. The trained machine learning model may be configured to generate the second sub-image of the second modality based on the first sub-image of the first modality, as described elsewhere in the present disclosure (e.g., FIG. 7 and descriptions thereof). For example, the processing device 120 may input each first sub-image of the plurality of first sub-images into the trained machine learning model. The trained machine learning model may output a second sub-image corresponding to the each first sub-image of the plurality of first sub-images.

In 830, the processing device 120 (e.g., the second generation unit 630) may generate the second image based on the plurality of second sub-images.

In some embodiments, the processing device 120 may generate the second image by combining the plurality of second sub-images. For example, the processing device 120 may generate the second image (e.g., a 3D image) by combining the plurality of second sub-images (e.g., a plurality of 2D sub-images) according to one or more image stitching algorithms. Exemplary image stitching algorithms may include a parallax-tolerant image stitching algorithm, a perspective preserving distortion for image stitching, a projection interpolation image stitching algorithm, or the like.

For illustration purposes, an MR image-to-CT image translation process is taken as an example. The processing device 120 may obtain a 3D MR image acquired by an MRI device. The processing device 120 may divide the 3D MR image into a plurality of 2D MR sub-images. The processing device 120 may input each 2D MR sub-image of the plurality of 2D MR sub-images into a trained machine learning model (e.g., a trained GAN model). The trained machine learning model may output a 2D CT sub-image corresponding to the each 2D MR sub-image of the plurality of 2D MR sub-images. The processing device 120 may generate a 3D CT image corresponding to the 3D MR image based on a plurality of 2D CT sub-images outputted from the trained machine learning model according to one or more image stitching algorithms as described elsewhere in the present disclosure.

Accordingly, the trained machine learning model may generate the plurality of second sub-images of the second modality by processing the plurality of first sub-images of the first modality. Since a size of the first sub-image is smaller than a size of the first image, the processing speed of the trained machine learning model may be improved, and accordingly the efficiency of image processing process may also be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 9 is a flowchart illustrating an exemplary process for determining a trained machine learning model according to some embodiments of the present disclosure. In some embodiments, the process 900 may be implemented in the image processing system 100 illustrated in FIG. 1. For example, the process 900 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 910, the processing device 120 (e.g., the obtaining module 410) may obtain a plurality of groups of training samples.

In some embodiments, each group of the plurality of groups of training samples may include a sample input image and a reference image. In some embodiments, the sample input image and the reference image in the each group of the plurality of groups of training samples may correspond to or represent a same portion or position of a same subject. For example, the sample input image and the reference image in a group of training samples may correspond to a same region of interest (ROI) (e.g., a tumor) of the subject. The plurality of groups of training samples may correspond to a same subject or different subjects.

The sample input image and the reference image in the each group of training samples may be of different modalities. For example, the sample input image may be in a first modality and the reference image may be in a second modality. The second modality may be different from the first modality. For example, the sample input image may be an MR image acquired by an MRI device, and the reference image may be a CT image acquired by a CT device. The MR image and the CT image may correspond to a same ROI (e.g., a tumor) of a subject.

In some embodiments, the sample input image and the reference image in the each group of training samples may be unregistered. As used herein, image registration may refer to a process of transforming spatial information of different images into a same coordinate system in order to compare or integrate the data obtained from the different images. In some embodiments, the image registration may include a rigid registration and a deformable registration (also referred to as a non-rigid registration). The rigid registration may refer to a registration procedure that involves global rotation (s) and/or translation(s) of all pixels in an image. The deformable registration may refer to a process of finding a point to point (e.g., pixel to pixel) mapping relationship between two images.

In some embodiments, the processing device 120 may obtain a plurality of first historical images from one or more components (e.g., the imaging device 110, the terminal 140, and/or the storage device 130) of the image processing system 100 or an external storage device via the network 150. The plurality of first historical images may be generated by a first imaging device (e.g., an MR imaging device, a CT device, a PET device) via imaging a subject or a part of the subject. The processing device 120 may determine the plurality of first historical images as the sample input images. In some embodiments, the processing device 120 may obtain a plurality of second historical images from one or more components (e.g., the imaging device 110, the terminal 140, and/or the storage device 130) of the image processing system 100 or an external storage device via the network 150. The plurality of second historical images may be generated by a second imaging device (e.g., an MR imaging device, a CT device, a PET device) via imaging the same subject or the same part of the subject. The second imaging device may be different from the first imaging device. The processing device 120 may determine the plurality of second historical images as the reference images. In some embodiments, the sample input image and the corresponding reference image may be unregistered.

In 920, the processing device 120 (e.g., the training module 420) may generate a trained discriminative model by training a preliminary discriminative model using the plurality of groups of training samples.

The trained discriminative model may be configured to evaluate an output of a generative model (e.g., a preliminary generative model, an intermediate generative model, a trained generative model). In some embodiments, the trained discriminative model may include a first trained discriminative model and a second trained discriminative model. The first trained discriminative model may be configured to evaluate a difference between a predicted output (e.g., a sample intermediate image) of the generative model (e.g., the preliminary generative model, the intermediate generative model, the trained generative model) and a desired output (e.g., a reference image). For example, the first trained discriminative model may determine a first evaluation value relating to the difference between a sample intermediate image and a reference image corresponding to a sample input image that generates the sample intermediate image. The second trained discriminative model may be configured to evaluate a difference between the predicted output (e.g., the sample intermediate image) of the generative model and an input (e.g., a sample input image) of the generative model. For example, the second trained discriminative model may determine a second evaluation value relating to the difference between a sample input image and a sample intermediate image. More description of the determination of the first evaluation value and the second evaluation value may be found elsewhere in the present disclosure (e.g., FIG. 10 and descriptions thereof).

The preliminary discriminative model may refer to a machine learning model to be trained. In some embodiments, the processing device 120 may initialize one or more parameter values of one or more first parameters in the preliminary discriminative model. In some embodiments, the initialized values of the first parameters may be default values determined by the image processing system 100 or preset by a user of the image processing system 100. In some embodiments, the processing device 120 may obtain the preliminary discriminative model from a storage device (e.g., the storage device 130) of the image processing system 100 and/or an external storage device via the network 150.

In some embodiments, the trained discriminative model (e.g., the first trained discriminative model, the second trained discriminative model) may be determined by performing an iterative process to iteratively update the one or more first parameters in the preliminary discriminative model (e.g., a first preliminary discriminative model, a second preliminary discriminative model). In some embodiments, a generative model (e.g., a preliminary generative model, an intermediate generative model) may be fixed when training the one or more first parameters in the preliminary discriminative model. A group of training samples including a sample input image and a reference image may be inputted into the generative model. For example, a specific sample input image of a group of training samples may be inputted into the generative model, and a reference image of the group of training samples may be inputted into the preliminary discriminative model. The generative model may output a sample intermediate image based on the specific sample input image. The preliminary discriminative model may receive the sample intermediate image and distinguish the sample intermediate image from the reference image and/or the specific sample input image. The one or more first parameters may be updated and/or adjusted to cause the preliminary discriminative model (or an intermediate discriminative model) can accurately distinguish the sample intermediate image from the reference image and/or the specific sample input image. For example, one or more first parameters of the first preliminary discriminative model may be updated and/or adjusted so that the first preliminary discriminative model can accurately distinguish the sample intermediate image and the reference image. One or more first parameters of the second preliminary discriminative model may be updated and/or adjusted to cause the second preliminary discriminative model can accurately distinguish the sample intermediate image and specific sample input image. The trained discriminative model may be determined based on the updated first parameters.

In 930, the processing device 120 (e.g., the training module 420) may generate, based on the trained discriminative model, a trained generative model by training a preliminary generative model using the plurality of groups of training samples.

The preliminary generative model may refer to a machine learning model to be trained. The preliminary generative model may include one or more second parameters. In some embodiments, the processing device 120 may initialize one or more parameter values of the one or more second parameters in the preliminary generative model. In some embodiments, the initialized values of the second parameters may be default values determined by the image processing system 100 or preset by a user of the image processing system 100. In some embodiments, the processing device 120 may obtain the preliminary generative model from a storage device (e.g., the storage device 130) of the image processing system 100 and/or an external storage device via the network 150.

The processing device 120 may train, based on the trained discriminative model, the preliminary generative model by iteratively updating, based on the plurality of groups of training samples, the parameter values of the one or more second parameters in the preliminary generative model. An exemplary iteration is described below in FIG. 10.

Figure 10:
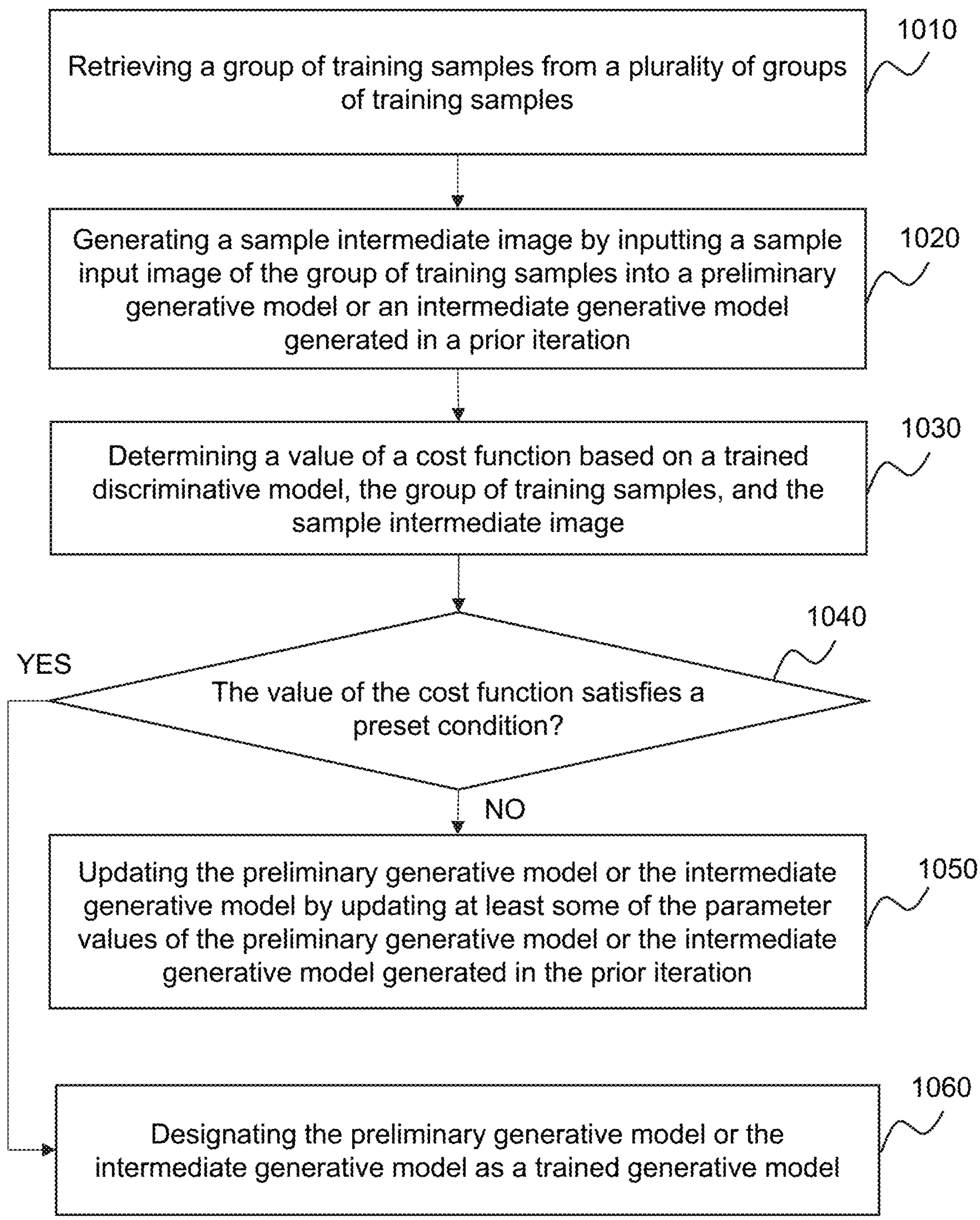
FIG. 10 is a flowchart illustrating an exemplary process for determining a trained generative model according to some embodiments of the present disclosure.

FIG. 10 is a flowchart illustrating an exemplary process for determining a trained generative model according to some embodiments of the present disclosure. In some embodiments, the process 1000 may be implemented in the image processing system 100 illustrated in FIG. 1. For example, the process 1000 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In 1010, the processing device 120 (e.g., the obtaining module 410) may retrieve a group of training samples from a plurality of groups of training samples.

In some embodiments, the processing device 120 may retrieve the group of training samples from the plurality of groups of training samples randomly. The group of training samples may include a sample input image and a reference image. The sample input image and the reference image of the group may be of different modalities as described elsewhere in the present disclosure. In some embodiments, the sample input image and the reference image of the group may be unregistered.

In 1020, the processing device 120 (e.g., the generation unit 510) may generate a sample intermediate image by inputting a sample input image of the group of training samples into a preliminary generative model or an intermediate generative model generated in a prior iteration.

For example, the processing device 120 may input the sample input image into the preliminary generative model or the intermediate generative model generated in the prior iteration. The preliminary generative model or the intermediate generative model may output the sample intermediate image based on the inputted sample input image.

In 1030, the processing device 120 (e.g., the first evaluation value determination unit 520, the second evaluation value determination unit 530) may determine a value of a cost function based on a trained discriminative model, the group of training sample, and the sample intermediate image.

In some embodiments, the processing device 120 may input the sample input image, the reference image corresponding to the sample input image, and the sample intermediate image into the trained discriminative model. The trained discriminative model may generate the value of the cost function based on a comparison of the sample intermediate image with the reference image and/or a comparison of the sample intermediate image with the sample input image. The value of the cost function may indicate a degree of similarity or difference between the sample intermediate image of the trained generative model and the reference image inputted into the trained discriminative model, and/or a degree of similarity or difference between the sample intermediate image of the trained generative model and the sample input image inputted into the trained discriminative model. In some embodiments, the trained discriminative model may include a first trained discriminative model and a second trained discriminative model. The first trained discriminative model may determine the degree of similarity or difference between the sample intermediate image and the reference image. The second trained discriminative model may determine the degree of similarity or difference between the sample intermediate image and the sample input image.

The processing device 120 may determine, based on the sample intermediate image and the reference image, a first evaluation value (also referred to as a first classification accuracy) relating to the difference between the sample intermediate image and the reference image using the first trained discriminative model. In some embodiments, the processing device 120 may input the sample intermediate image and the reference image into the first trained discriminative model. The first trained discriminative model may extract at least one first feature in the sample intermediate image and at least one second feature in the reference image according to one or more feature extraction algorithms. In some embodiments, the at least one first feature and/or the at least one second feature may include color information, edge information, texture information, shape information, or the like, or any combination thereof. Exemplary color information may include values associated with red, green, blue (RGB), hue, saturation, value (HSV), luminance-bandwidth-chrominance (YUV), luminance, in-phase, quadrature (YIQ), or the like. Exemplary edge information may include high-frequency component information, edge histogram information, or the like. Exemplary texture information may include information associated with a homogeneous texture, a texture browsing, or the like. Exemplary shape information may include information associated with a region shape, a contour shape, a shape 3D, or the like. Exemplary feature extraction algorithms may include a principal component analysis (PCA), a linear discriminant analysis (LDA), an independent component analysis (ICA), a multi-dimensional scaling (MDS) algorithm, a discrete cosine transform (DCT) algorithm, or the like. The first trained discriminative model may determine the first evaluation value (e.g., a degree of similarity between the at least one first feature and the at least one second feature) by comparing the at least one first feature in the sample intermediate image and the at least one second feature in the reference image.

In some embodiments, if the difference between the at least one first feature and the at least one second feature is relatively large (e.g., the degree of similarity between the at least one first feature and the at least one second feature is less a threshold), the first trained discriminative model may distinguish the sample intermediate image from the reference image easily, and the first evaluation value may be relatively high (e.g., close to 1). If the difference between the at least one first feature and the at least one second feature is relatively small (e.g., the degree of similarity between the at least one first feature and the at least one second feature exceeds a threshold), the first trained discriminative model may be difficult to distinguish the sample intermediate image from the reference image, and the first evaluation value may be relatively low (e.g., close to 0.5). For example, if the first trained discriminative model cannot distinguish the sample intermediate image from the reference image, the first evaluation value may be set as 0.5.

The processing device 120 may determine, based on the sample input image and the sample intermediate image, a second evaluation value (also referred to as a second classification accuracy) relating to a difference between the sample input image and the sample intermediate image using the second trained discriminative model. In some embodiments, the processing device 120 may input the sample intermediate image and the sample input image into the second trained discriminative model. The second trained discriminative model may extract at least one first shape associated with the sample input image and at least one second shape associated with the sample intermediate image. For example, the second trained discriminative model may extract the at least one first shape and the at least one second shape according to one or more feature extraction algorithms as described elsewhere in the present disclosure.

In some embodiments, the processing device 120 may extract the at least one first shape associated with the sample input image and the at least one second shape associated with the sample intermediate image. For example, the processing device 120 may extract the at least one first shape and the at least one second shape using a shape extractor. The processing device 120 may input the at least one first shape and the at least one second shape into the second trained discriminative model.

The processing device 120 may determine, based on a difference between the at least one first shape and the at least one second shape, the second evaluation value using the second trained discriminative model. In some embodiments, if the difference between the at least one first shape and the at least one second shape is relatively large (e.g., a degree of similarity between the at least one first shape and the at least one second shape is less than a threshold), the second trained discriminative model may distinguish the sample intermediate image from the sample input image easily, and the second evaluation value may be relatively high (e.g., close to 1). If the difference between the at least one first shape and the at least one second shape is relatively small (e.g., the degree of similarity between the at least one first shape and the at least one second shape exceeds a threshold), the second trained discriminative model may be difficult to distinguish the sample intermediate image from the sample input image, and the second evaluation value may be relatively low (e.g., close to 0.5). For example, if the second trained discriminative model cannot distinguish the sample intermediate image from the sample input image, the second evaluation value may be set as 0.5.

The processing device 120 may determine, based on the first evaluation value and the second evaluation value, the value of the cost function. Merely by way of example, the value of the cost function may be determined according to Equation (1):

$$Loss = Ladv1 + L1 + Ladv2, \quad (1)$$

where Loss refers to a value of a cost function; Ladv1 refers to a first evaluation value generated by a first trained discriminative model; Ladv2 refers to a second evaluation value generated by a second trained discriminative model; and L1 refers to 1-norm of gray scales of a reference image and a sample intermediate image. In some embodiments, L1 may reflect a mutual information between the reference image and the sample intermediate image. As used herein, mutual information may refer to a quantity that measures a relationship between two variables (e.g., the reference image and the sample intermediate image). For example, a relatively high similarity between a pixel value distribution (e.g., a gray value distribution) of the sample intermediate image and a pixel value distribution (e.g., a gray value distribution) of the reference image may indicate a relatively high similarity between the sample intermediate image and the reference image.

In 1040, the processing device 120 (e.g., the training module 420) may determine whether the value of the cost function satisfies a preset condition.

In some embodiments, the processing device 120 may determine whether the value of the cost function exceeds a threshold in a current iteration. The threshold may be manually set by a user of the image processing system 100 or determined by one or more components (e.g., the processing device 120) of the image processing system 100.

In response to a determination that the value of the cost function exceeds the threshold in the current iteration, the processing device 120 may determine that the value of the cost function does not satisfy the preset condition, and process 1000 may proceed to operation 1050. In 1050, the processing device 120 (e.g., the updating unit 540) may update the preliminary generative model or the intermediate generative model generated in the prior iteration by updating at least some of the parameter values of the preliminary generative model or the intermediate generative model. For example, the processing device 120 may adjust and/or update the at least some of the parameter values of the preliminary generative model or the intermediate generative model to cause the value of the cost function less than the threshold.

In response to a determination that the value of the cost function is less than the threshold in the current iteration, the processing device 120 may determine that the value of the cost function satisfies the preset condition, and process 1000 may proceed to operation 1060. In 1060, the processing device 120 (e.g., the training module 420) may designate the preliminary generative model or the intermediate generative model as a trained generative model.

The processing device 120 may determine that the corresponding updated generative model (e.g., the preliminary generative model or the intermediate generative model) obtained at the last iterative operation is sufficiently trained. The processing device 120 may designate the updated generative model as the trained generative model. The trained generative model may be configured to generate a second image of a second modality based on a first image of a first modality, as described elsewhere in the present disclosure (e.g., FIG. 7, and descriptions thereof).

It should be noted that, in response to a determination that the value of the cost function is equal to the threshold in the current iteration, the processing device 120 may either determine that the value of the cost function satisfies the preset condition or determine that the value of the cost function does not satisfy the preset condition.

According to some embodiments of the present disclosure, a second image of a second modality may be generated by a trained GAN model based on a first image of a first modality. The trained GAN model may include a trained generative model and a trained discriminative model. The trained generative model may be determined by training a preliminary generative model based on the trained discriminative model and a plurality of groups of training samples. Specifically, at least some of parameter values of the preliminary generative model (or an intermediate generative model) may be adjusted and/or updated based on a value of a cost function generated from the trained discriminative model based on the plurality of groups of training samples. The value of the cost function may be determined based on a first evaluation value relating to a difference between a sample intermediate image and a reference image generated by a first discriminative model, and a second evaluation value relating to a difference between a sample input image and the sample intermediate image generated by a second discriminative model. Therefore, a predicated output (e.g., the sample intermediate image) of the trained generative model may be similar to a desired output (e.g., the reference image), and a shape associated with the predicted output (e.g., the sample intermediate image) may also be similar to a shape associated with an input (e.g., the sample input image) of the trained generative model. Accordingly, the accuracy of the second image generated from the trained generative model may be improved.

In addition, the trained machine learning model may be constructed based on a GAN, and the calculation amount of the training of the machine learning model may be reduced. The efficiency of the training of the machine learning model may be improved, and accordingly the efficiency of image processing may also be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the sample input image and the reference image in the each group of the plurality of groups of training samples may be of different resolutions. For example, the sample input image may have a first resolution and the reference image may have a second resolution. The second resolution may be different from the first resolution. In some embodiments, the second resolution may be higher than the first resolution. For example, the sample input image may be an MR image acquired by an MRI device with a resolution of 512 ppi, and the reference image may be a CT image acquired by a CT device with a resolution of 1024 ppi. The MR image and the CT image may correspond to a same ROI (e.g., a tumor) of a subject.

In some embodiments, one or more other optional operations (e.g., a preprocess operation, a storing operation) may be added elsewhere in the process 1000. In some embodiments, the processing device 120 may preprocess the sample input image and the reference image in the each group of the plurality of groups of training samples. For example, the processing device 120 may perform a rigid registration operation on the sample input image and the reference image in the each group of the plurality of groups of training samples. The rigid registration between the sample input image and the reference image may align the sample input image to the reference image.

In some embodiments, in a storing operation, the processing device 120 may store information and/or data (e.g., the plurality of groups of training samples, the trained machine learning model) associated with the image processing system 100 in a storage device (e.g., the storage device 130) disclosed elsewhere in the present disclosure.

Figure 11:
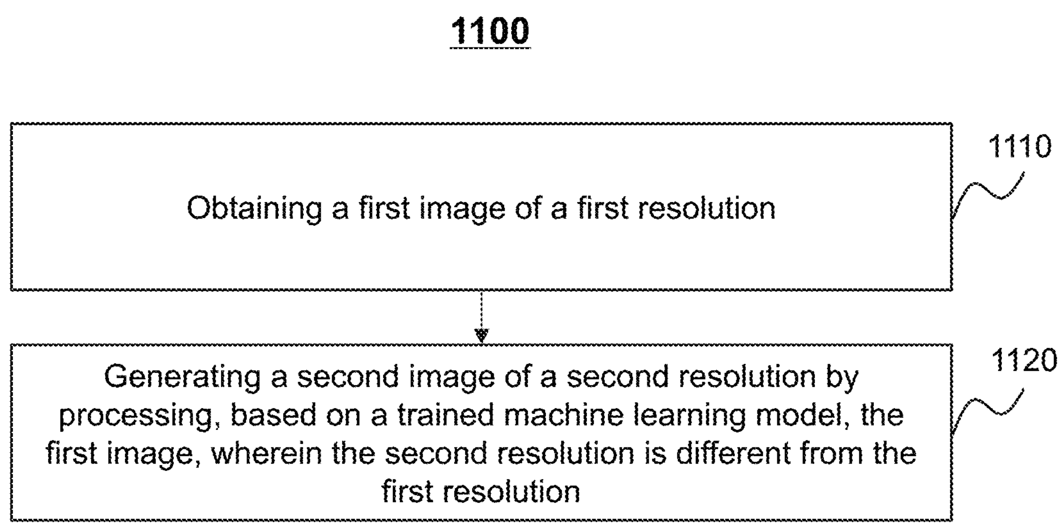
FIG. 11 is a flowchart illustrating an exemplary process for generating a second image of a second resolution based on a first image of a first resolution according to some embodiments of the present disclosure.

FIG. 11 is a flowchart illustrating an exemplary process for generating a second image of a second resolution based on a first image of a first resolution according to some embodiments of the present disclosure. In some embodiments, the process 1100 may be implemented in the image processing system 100 illustrated in FIG. 1. For example, the process 1100 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting.

In 1110, the processing device 120 (e.g., the obtaining module 410) may obtain a first image of a first resolution.

In some embodiments, the processing device 120 may obtain the first image from one or more components (e.g., the imaging device 110, the terminal 140, and/or the storage device 130) of the image processing system 100 or an external storage device via the network 150. For example, the imaging device 110 may transmit acquired imaging data (e.g., projection data) to the storage device 130, or any other storage device for storage. The processing device 120 may obtain the imaging data from the storage device 130, or any other storage device and reconstruct the first image based on the imaging data. As another example, the processing device 120 may obtain the first image from the imaging device 110 directly. In some embodiments, the processing device 120 may obtain the first image from the I/O 230 of the computing device 200 via the communication port 240, and/or the I/O 350 of the mobile device 300 via the communication platform 310.

In 1120, the processing device 120 (e.g., the generation module 430) may generate a second image of a second resolution by processing, based on a trained machine learning model, the first image. The second resolution may be different from the first resolution. In some embodiments, the second resolution may be higher than the first resolution.

In some embodiments, the first image and/or the second image may be a medical image. For example, the first image and/or the second image may be associated with a specific portion (e.g., the head, the thorax, the abdomen), an organ (e.g., a lung, the liver, the heart, the stomach), and/or tissue (e.g., muscle tissue, connective tissue, epithelial tissue, nervous tissue) of a human or an animal.

In some embodiments, the first image and/or the second image may include a CT image, an MR image, a PET image, a US image, an X-ray image, or the like. In some embodiments, the first image and/or the second image may include a 2D image, a 3D image, a 4D image, or the like.

The second resolution may be different from the first resolution. In some embodiments, the second resolution may be higher than the first resolution. For example, the first image may have a resolution of 512 ppi, and the second image may have a resolution of 1024 ppi. In some embodiments, a first modality of the first image may be the same as or different from a second modality of the second image.

In some embodiments, the trained machine learning model may be configured to generate the second image of the second resolution based on the first image of the first resolution. In some embodiments, the trained machine learning model may be constructed based on a convolutional neural network model (CNN), a fully convolutional neural network (FCN) model, a generative adversarial network (GAN) model, or the like, or any combination thereof. For illustration purposes, the processing device 120 may obtain a first MR image acquired by an MRI device with a resolution of 512 ppi. The processing device 120 may input the first MR image into the trained machine learning model (e.g., a trained GAN model). The trained machine learning model (e.g., the trained GAN model) may output a second MR image with a resolution of 1024 ppi.

In some embodiments, the trained machine learning model may be determined by training a preliminary machine learning model as described elsewhere in the present disclosure (e.g., FIG. 7 and descriptions thereof). In some embodiments, the trained machine learning model (e.g., a trained GAN model) may include a trained generative model and a trained discriminative model connected with the trained generative model. The trained discriminative model may be determined by training a preliminary discriminative model using a plurality of groups of training samples. Each group of the plurality of groups of training samples may include a sample input image and a reference image. The sample input image and the reference image of the group may be of different resolutions. In some embodiments, the sample input image and the reference image of the group may be unregistered. The trained generative model may be generated, based on the trained discriminative model, by training a preliminary generative model using the plurality of groups of training samples. For example, the preliminary generative model (or an intermediate generative model) may generated an output (e.g., a sample intermediate image) based on an input (e.g., a sample input image). The trained discriminative model may evaluate the output (e.g., the sample intermediate image) of the preliminary generative model (or the intermediate generative model) and send an evaluation result (e.g., a value of a cost function) to the preliminary generative model (or the intermediate generative model). The preliminary generative model (or the intermediate generative model) may be updated based on the evaluation result to generate the trained generative model. The trained generative model may be configured to generate the second image of the second resolution based on the first image of the first resolution. More descriptions of the determination of the trained machine learning model may be found elsewhere in the present disclosure (e.g., FIG. 12, and descriptions thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 12 is a flowchart illustrating an exemplary process for determining a trained machine learning model according to some embodiments of the present disclosure. In some embodiments, the process 1200 may be implemented in the image processing system 100 illustrated in FIG. 1. For example, the process 1200 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting.

In 1210, the processing device 120 (e.g., the obtaining module 410) may obtain a plurality of groups of training samples.

Each group of the plurality of groups of training samples may include a sample input image and a reference image. The sample input image and the reference image in the each group of the plurality of groups of training samples may be of different resolutions. For example, the sample input image may have a first resolution and the reference image may have a second resolution. The second resolution may be different from the first resolution. In some embodiments, the second resolution may be higher than the first resolution. For illustration purposes, the sample input image may be a first MR image with a resolution of 512 ppi, and the reference image may be a second MR image with a resolution of 1024 ppi. In some embodiments, the sample input image and the reference image in the each group of training samples may be unregistered.

In some embodiments, the processing device 120 may obtain a plurality of historical images from one or more components (e.g., the imaging device 110, the terminal 140, and/or the storage device 130) of the image processing system 100 or an external storage device via the network 150. The plurality of historical images may be generated by an imaging device (e.g., an MR imaging device, a CT device, a PET device) via imaging a subject or a part of the subject. The processing device 120 may determine the plurality of historical images as the reference images. The processing device 120 may obtain the corresponding sample input images by processing the reference images. For example, the processing device 120 may obtain a sample input image by extracting pixel values of a portion of pixels in the corresponding reference image. In some embodiments, the processing device 120 may further adjust the sample input image. For example, the processing device 120 may perform a padding (e.g., a zero-padding) on the other portion of the pixels in the reference image.

In 1220, the processing device 120 (e.g., the training module 420) may generate a trained discriminative model by training a preliminary discriminative model using the plurality of groups of training samples.

The trained discriminative model may be configured to evaluate an output of a generative model (e.g., a preliminary generative model, an intermediate generative model, a trained generative model). In some embodiments, the trained discriminative model may include a first trained discriminative model and a second trained discriminative model. The first trained discriminative model may be configured to evaluate a difference between a predicted output (e.g., a sample intermediate image) of the generative model (e.g., a preliminary generative model, an intermediate generative model, a trained generative model) and a desired output (e.g., a reference image). The second trained discriminative model may be configured to evaluate a difference between the predicted output (e.g., the sample intermediate image) of the generative model and an input (e.g., a sample input image) of the generative model.

The preliminary discriminative model may refer to a machine learning model to be trained. In some embodiments, the trained discriminative model (e.g., the first trained discriminative model, the second trained discriminative model) may be determined by performing an iterative process to iteratively update one or more first parameters in the preliminary discriminative model (e.g., a first preliminary discriminative model, a second preliminary discriminative model). More descriptions of the determination of the trained discriminative model may be found elsewhere in the present disclosure (e.g., operation 920 in FIG. 9, and descriptions thereof).

In 1230, the processing device 120 (e.g., the training module 420) may generate, based on the trained discriminative model, a trained generative model by training a preliminary generative model using the plurality of groups of training samples.

The preliminary generative model may refer to a machine learning model to be trained. The processing device 120 may train, based on the trained discriminative model, the preliminary generative model by iteratively updating, based on the plurality of groups of training samples, the parameter values of one or more second parameters in the preliminary generative model. For each iteration of an iterative process, the processing device 120 may retrieve a group of training samples from the plurality of groups of training samples. The processing device 120 may generate a sample intermediate image by inputting a sample input image of the group of training samples into the preliminary generative model or an intermediate generative model generated in a prior iteration. The processing device 120 may determine a value of a cost function based on the trained discriminative model, the group of training sample, and the sample intermediate image. For example, the processing device 120 may determine a first evaluation value relating to a difference between the sample intermediate image and the reference image using the first trained discriminative model. The processing device 120 may determine a second evaluation value relating to a difference between the sample input image and the sample intermediate image using the second trained discriminative model. The processing device 120 may determine the value of the cost function based on the first evaluation value and the second evaluation value according to Equation (1) as described elsewhere in the present disclosure.

The processing device 120 may determine whether the value of the cost function satisfies a preset condition. In some embodiments, the processing device 120 may determine whether the value of the cost function exceeds a threshold in a current iteration. In response to a determination that the value of the cost function exceeds the threshold in the current iteration, the processing device 120 may determine that the value of the cost function does not satisfy the preset condition. The processing device 120 may update the preliminary generative model or the intermediate generative model generated in the prior iteration by updating at least some of the parameter values of the preliminary generative model or the intermediate generative model.

In response to a determination that the value of the cost function is less than the threshold in the current iteration, the processing device 120 may determine that the value of the cost function satisfies the preset condition. The processing device 120 may designate the preliminary generative model or the intermediate generative model as the trained generative model. The trained generative model may be configured to generate a second image of a second resolution based on a first image of a first resolution, as described elsewhere in the present disclosure (e.g., FIG. 11, and descriptions thereof). More descriptions of the determination of the trained generative model may be found elsewhere in the present disclosure (e.g., operation 930 in FIG. 9, FIG. 10, and descriptions thereof).

It should be noted that, in response to a determination that the value of the cost function is equal to the threshold in an iteration, the processing device 120 may either determine that the value of the cost function satisfies the preset condition or determine that the value of the cost function does not satisfy the preset condition.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 13:
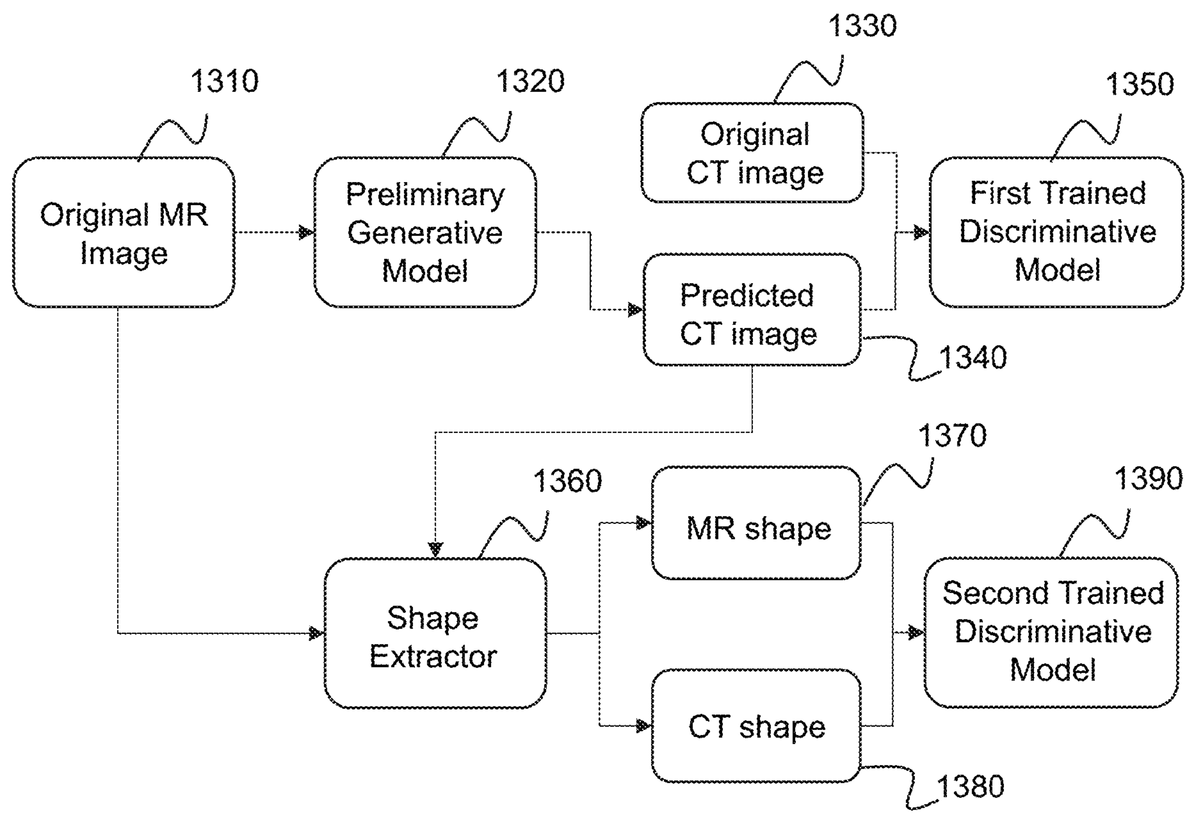
FIG. 13 is a schematic diagram illustrating an exemplary process for determining a trained generative model according to some embodiments of the present disclosure.

FIG. 13 is a schematic diagram illustrating an exemplary process for determining a trained generative model according to some embodiments of the present disclosure.

As illustrated in FIG. 13, the processing device 120 may obtain a plurality of groups of training samples, as described in connection with operation 1010. Each group of the plurality of groups of training samples may include a sample input image (e.g., an original MR image 1310) and a corresponding reference image (e.g., an original CT image 1330). In some embodiments, the sample input image and the corresponding reference image may be unregistered. The processing device 120 may input the original MR image 1310 into a preliminary generative model 1320. The preliminary generative model 1320 may output a sample intermediate image (e.g., a predicted CT image 1340) based on the original MR image 1310, as described in connection with operation 1020.

The processing device 120 may input the predicted CT image 1340 and the original CT image 1330 into a first trained discriminative model 1350. The first trained discriminative model 1350 may determine a first evaluation value relating to a difference between the original CT image 1330 and the predicted CT image 1340. The processing device 120 may input the original MR image 1310 and the predicted CT image 1340 into a shape extractor 1360. The shape extractor 1360 may extract a first shape associated with the original MR image 1310 (e.g., an MR shape 1370) and a second shape associated with the predicted CT image 1340 (e.g., a CT shape 1380). The MR shape 1370 and the CT shape 1380 may be inputted into a second trained discriminative model 1390. The second trained discriminative model 1390 may determine a second evaluation value relating to a difference between the MR shape 1370 and the CT shape 1380. The processing device 120 may determine a value of a cost function based on the first evaluation value and the second evaluation value, as described in connection with operation 1030.

The processing device 120 may determine whether the value of the cost function satisfies a preset condition, as described in connection with operation 1040. For example, the processing device 120 may determine whether the value of the cost function exceeds a threshold. In response to a determination that the value of the cost function exceeds the threshold, the processing device 120 may determine that the value of the cost function does not satisfy the preset condition. The processing device 120 may update the preliminary generative model 1320 by updating at least some of parameter values of the preliminary generative model 1320 until the value of the cost function satisfies the preset condition, as described in connection with operation 1050. In response to a determination that the value of the cost function is less than the threshold, the processing device 120 may determine that the value of the cost function satisfies the preset condition. The processing device 120 may designate the corresponding updated generative model as a trained generative model, as described in connection with operation 1060. The trained generative model may be configured to generate a second image of a second modality (e.g., a CT image) based on a first image of a first modality (e.g., an MR image), as described elsewhere in the present disclosure (e.g., FIG. 7, and descriptions thereof).

Figure 14:
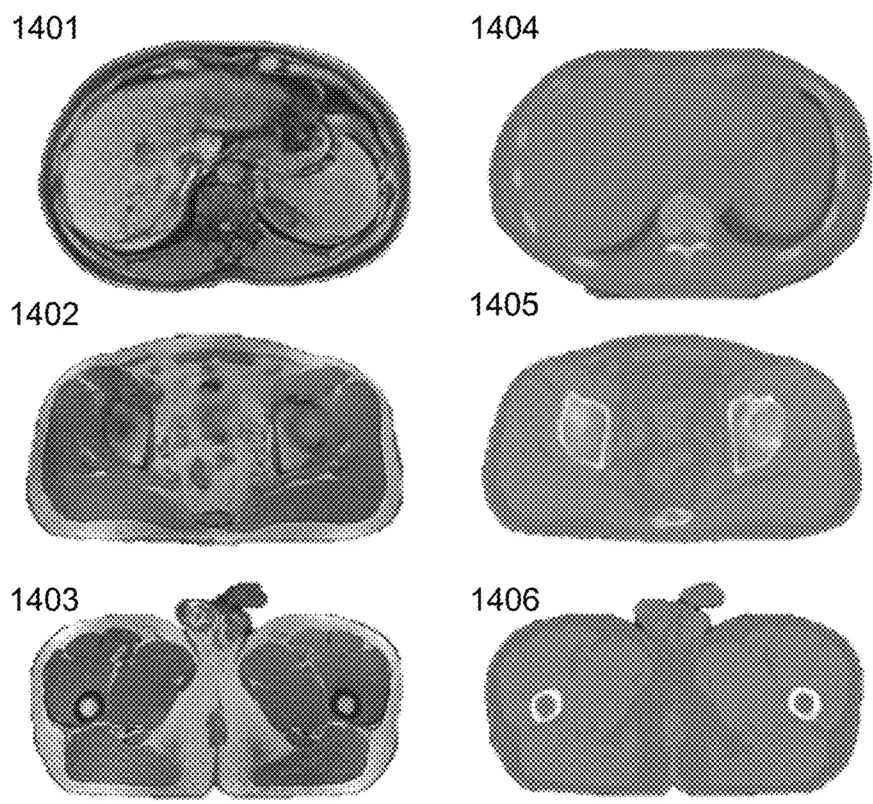
FIG. 14 is schematic diagram illustrating exemplary CT images generated by a trained machine learning model based on MR images according to some embodiments of the present disclosure.

FIG. 14 is schematic diagram illustrating exemplary CT images generated by a trained machine learning model based on MR images according to some embodiments of the present disclosure.

As illustrated in FIGS. 14, 1401, 1402, and 1403 refer to a plurality of original MR images acquired by an MRI device. The reference numeral 1404 refers to a predicted CT image generated by a trained machine learning model based on the original MR image 1401. The reference numeral 1405 refers to a predicted CT image generated by the trained machine learning model based on the original MR image 1402. The reference numeral 1406 refers to a predicted CT image generated by the trained machine learning model based on the original MR image 1403.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A system for image processing, comprising:

at least one storage device storing a set of instructions; and at least one processor in communication with the at least one storage device, when executing the stored set of instructions, the at least one processor causes the system to perform operations including:

obtaining a first image of a first modality;

generating a second image of a second modality by processing, based on a trained machine learning model, the first image;

wherein the second modality is different from the first modality, the trained machine learning model is a generative adversarial network (GAN) and includes a generative model, a first discriminative model, and a second discriminative model, and in a process of training the machine learning model, the first discriminative model is used to evaluate a difference between a predicted image of the generative model and a reference image, the reference image is a desired predicted image, and the second discriminative model is used to evaluate a difference between at least one first shape extracted from the predicted image of the generative model and at least one second shape extracted from a sample input image of the generative model.

2. The system of claim 1, wherein the trained machine learning model is obtained according to a training process including:

obtaining a plurality of groups of training samples; and generating the trained machine learning model by training a preliminary machine learning model using the plurality of groups of training samples, wherein each group of the plurality of groups of training samples includes the sample input image and the reference image, the sample input image and the reference image of the group being of different modalities.

3. The system of claim 2, the training process further including:

performing a rigid registration operation on the sample input image and the reference image in each group of the plurality of groups of training samples.

4. The system of claim 1, wherein the first image or the second image includes at least one of a computed tomography (CT) image, a magnetic resonance imaging (MRI) image, a positron emission tomography (PET) image, an ultrasound (US) image, or an X-ray image.

5. The system of claim 1, wherein the generating a second image of a second modality by processing, based on a trained machine learning model, the first image includes:

dividing the first image into a plurality of first sub-images;

generating a plurality of second sub-images by processing, based on the trained machine learning model, the plurality of first sub-images; and generating, based on the plurality of second sub-images, the second image.

6. The system of claim 1, wherein the generative model, the first discriminative model, and the second discriminative model are called a trained generative model, a first trained discriminative model, and a second trained discriminative model, and generating the trained machine learning model by training the preliminary machine learning model using the plurality of groups of training samples further includes:

generating the first trained discriminative model and the second trained discriminative model by training a first preliminary discriminative model and a second preliminary discriminative model using the plurality of groups of training samples; and generating, based on the first trained discriminative model and the second trained discriminative model, the trained generative model by training the preliminary generative model using the plurality of groups of training samples.

7. The system of claim 6, wherein generating, based on the first trained discriminative model and the second trained discriminative model, the trained generative model by training the preliminary generative model using the plurality of groups of training samples further includes:

initializing parameter values of the preliminary generative model; and training, based on the first trained discriminative model and the second trained discriminative model, the preliminary generative model by iteratively updating, based on the plurality of groups of training samples, the parameter values of the preliminary generative model.

8. The system of claim 7, wherein iteratively updating, based on the plurality of groups of training samples, the parameter values of the preliminary generative model includes performing an iterative process, and for each iteration of the iterative process, retrieving a group of training samples from the plurality of groups of training samples;

generating a sample intermediate image by inputting a sample input image of the group of training samples into the preliminary generative model or an intermediate generative model generated in a prior iteration;

determining a value of a cost function based on the first trained discriminative model, and the second trained discriminative model, the group of training samples, and the sample intermediate image; and in response to a determination that the value of the cost function does not satisfy a preset condition, updating the preliminary generative model or the intermediate generative model by updating at least some of the parameter values of the preliminary generative model or the intermediate generative model generated in a prior iteration.

9. The system of claim 8, wherein the determining a value of a cost function further includes:

determining, based on the sample intermediate image and the reference image, a first evaluation value relating to a difference between the sample intermediate image and the reference image using the first trained discriminative model;

determining, based on the sample input image and the sample intermediate image, a second evaluation value relating to a difference between the sample input image and the sample intermediate image using the second trained discriminative model; and determining, based on the first evaluation value and the second evaluation value, the value of the cost function.

10. The system of claim 9, wherein determining, based on the sample input image and the sample intermediate image, a second evaluation value relating to a difference between the sample input image and the sample intermediate image using the second trained discriminative model further includes:

extracting at least one first shape associated with the sample input image and at least one second shape associated with the sample intermediate image; and determining, based on a difference between the at least one first shape and the at least one second shape, the second evaluation value using the second trained discriminative model.

11. The system of claim 10, wherein extracting at least one first shape associated with the sample input image and at least one second shape associated with the sample intermediate image includes:

extracting the at least one first shape associated with the sample input image and the at least one second shape associated with the sample intermediate image using a shape extractor.

12. A non-transitory computer readable medium, comprising at least one set of instructions, wherein when executed by at least one processor of a computing device, the at least one set of instructions cause the at least one processor to effectuate a method comprising:

obtaining a first image of a first modality;

generating a second image of a second modality by processing, based on a trained machine learning model, the first image;

wherein the second modality is different from the first modality, the trained machine learning model is a generative adversarial network (GAN) and includes a generative model, a first discriminative model, and a second discriminative model, and in a process of training the machine learning model, the first discriminative model is used to evaluate a difference between a predicted image of the generative model and a reference image, the reference image is a desired predicted image, and the second discriminative model is used to evaluate a difference between at least one first shape extracted from the predicted image of the generative model and at least one second shape extracted from a sample input image of the generative model.

13. A system comprising:

at least one storage device storing a set of instructions; and at least one processor in communication with the at least one storage device, when executing the stored set of instructions, the at least one processor causes the system to perform operations including:

obtaining a first image of a first modality and a first resolution;

generating a second image of a second modality and a second resolution by processing, based on a trained machine learning model, the first image;

wherein the second modality is different from the first modality, the second resolution is different from the first resolution, the trained machine learning model is a generative adversarial network (GAN) and includes a generative model, a first discriminative model, and a second discriminative model, and in a process of training the machine learning model, the first discriminative model is used to evaluate a difference between a predicted image of the generative model and a reference image, the reference image is a desired predicted image, and the second discriminative model is used to evaluate a difference between at least one first shape extracted from the predicted image of the generative model and at least one second shape extracted from a sample input image of the generative model.

14. The system of claim 13, wherein the trained machine learning model is obtained according to a training process including:

obtaining a plurality of groups of training samples; and generating the trained machine learning model by training a preliminary machine learning model using the plurality of groups of training samples, wherein each group of the plurality of groups of training samples includes the sample input image and the reference image, the sample input image and the reference image of the group being of different modalities and different resolutions.

15. The system of claim 14, wherein the generative model, the first discriminative model, and the second discriminative model are called a trained generative model, a first trained discriminative model, and a second trained discriminative model, and generating the trained machine learning model by training a preliminary machine learning model using the plurality of groups of training samples further includes:

generating the first trained discriminative model and the second trained discriminative model by training a first preliminary discriminative model and a second preliminary discriminative model using the plurality of groups of training samples; and generating, based on the first trained discriminative model and the second trained discriminative model, the trained generative model by training the preliminary generative model using the plurality of groups of training samples.

16. The system of claim 15, wherein generating, based on the first trained discriminative model and the second trained discriminative model, the trained generative model by training the preliminary generative model using the plurality of groups of training samples further includes:

initializing parameter values of the preliminary generative model; and training, based on the first trained discriminative model and the second trained discriminative model, the preliminary generative model by iteratively updating, based on the plurality of groups of training samples, the parameter values of the preliminary generative model.

17. The system of claim 16, wherein iteratively updating, based on the plurality of groups of training samples, the parameter values of the preliminary generative model includes performing an iterative process, and for each iteration of the iterative process, retrieving a group of training samples from the plurality of groups of training samples;

generating a sample intermediate image by inputting a sample input image of the group of training samples into the preliminary generative model or an intermediate generative model generated in a prior iteration;

determining a value of a cost function based on the first trained discriminative model, and the second trained discriminative model, the group of training samples, and the sample intermediate image; and in response to a determination that the value of the cost function does not satisfy a preset condition, updating the preliminary generative model or the intermediate generative model by updating at least some of the parameter values of the preliminary generative model or the intermediate generative model generated in a prior iteration.

18. The system of claim 17, wherein the determining a value of a cost function further includes:

determining, based on the sample intermediate image and the reference image, a first evaluation value relating to a difference between the sample intermediate image and the reference image using the first trained discriminative model;

determining, based on the sample input image and the sample intermediate image, a second evaluation value relating to a difference between the sample input image and the sample intermediate image using the second trained discriminative model; and determining, based on the first evaluation value and the second evaluation value, the value of the cost function.

19. The system of claim 18, wherein determining, based on the sample input image and the sample intermediate image, a second evaluation value relating to a difference between the sample input image and the sample intermediate image using the second trained discriminative model further includes:

extracting at least one first shape associated with the sample input image and at least one second shape associated with the sample intermediate image; and determining, based on a difference between the at least one first shape and the at least one second shape, the second evaluation value using the second trained discriminative model.

20. The system of claim 19, wherein extracting at least one first shape associated with the sample input image and at least one second shape associated with the sample intermediate image includes:

extracting the at least one first shape associated with the sample input image and the at least one second shape associated with the sample intermediate image using a shape extractor.

* * * * *